United States Patent [19]

Kramer

[11] Patent Number: 5,367,399
[45] Date of Patent: Nov. 22, 1994

[54] ROTATIONALLY SYMMETRIC DUAL REFLECTION OPTICAL BEAM SCANNER AND SYSTEM USING SAME

[75] Inventor: Charles J. Kramer, Rochester, N.Y.

[73] Assignee: Holotek Ltd., Rochester, N.Y.

[21] Appl. No.: 835,160

[22] Filed: Feb. 13, 1992

[51] Int. Cl.$^5$ .............................................. G02B 26/08
[52] U.S. Cl. .................................... 359/206; 359/212; 359/221; 359/490; 359/892; 250/236
[58] Field of Search ............................... 359/211–215, 359/222–223, 487–490, 871, 872, 874, 876, 884, 889, 891–892, 220, 221, 205, 206, 209, 495, 496–497; 250/235, 236

[56] References Cited

U.S. PATENT DOCUMENTS

| | | | |
|---|---|---|---|
| 3,346,319 | 10/1967 | Billings | 350/150 |
| 3,389,632 | 6/1968 | Plummer | 88/14 |
| 3,601,613 | 8/1971 | Hock | 356/152 |
| 3,612,694 | 10/1971 | Mottier | 356/152 |
| 3,677,621 | 7/1972 | Smith | 359/618 |
| 4,475,787 | 10/1984 | Starkweather | 359/211 |
| 4,502,783 | 5/1985 | Lau | 356/152 |
| 4,637,679 | 1/1987 | Funato | 359/212 |
| 4,662,707 | 5/1987 | Teach | 359/212 |
| 4,695,722 | 9/1987 | Motooka | 250/235 |
| 4,797,696 | 1/1989 | Allen | 354/4 |
| 4,852,956 | 8/1989 | Kramer | 359/17 |
| 4,853,709 | 8/1989 | Stein | 346/108 |
| 4,878,720 | 11/1989 | Hanke | 359/211 |
| 4,934,780 | 6/1990 | McGrath | 359/211 |
| 4,988,193 | 1/1991 | Cain | 250/233 |
| 4,992,890 | 2/1991 | Pinard | 358/474 |
| 5,040,861 | 8/1991 | Chu | 359/212 |
| 5,067,799 | 11/1991 | Gold | 359/495 |
| 5,073,879 | 12/1991 | Ando | 369/13 |
| 5,083,138 | 1/1992 | Nowak | 346/1.1 |

FOREIGN PATENT DOCUMENTS 63-239401 5/1988 Japan.
2-226111 9/1990 Japan.

OTHER PUBLICATIONS

Gerald F. Marshall, "Optical Feedback Overcomes Scan-Line Wobble in Laser Typesetting", Laser Focus World May 1991, pp. 167–178.

Leo Beiser, "Monogon Laser Scanner With No Line Wobble", SPIE Proceedings Vol. 1454, Beam Deflection and Scanning Technologies (1991 pp. 33–36).

Gerald F. Marshall, et al., "Butterfly Line Scanner", SPIE Proceedings, vol. 1454, Beam Deflection and Scanning Technologies (1991 pp. 37–45).

G. F. Marshall, "Optical Scanning", published by Marcel Dekker, Inc. New York, 1991, C. J. Kramer, Holographic Deflector for Graphic Arts Systems, Chapter 5.

*Primary Examiner*—Bruce Y. Arnold
*Assistant Examiner*—James Phan
*Attorney, Agent, or Firm*—M. LuKacher

[57] ABSTRACT

A dual reflection unpolarizing monofacet (DRUM) scanner or beam deflector is made up of two essentially identical 45° right angle prism elements with their hypotenuse faces together to form a body which may be rectangular or cylindrical and may be contained in a housing which provides for aerodynamic stability when the scanner rotates at high speed. The hypotenuse faces have a partially reflective surface on which an incident beam, collinear with the rotational axis, is incident. This beam is transmitted and reflected to provide dual beams, one of which is absorbed by light absorbing material, preferably a coating, on a surface of the body and the transmitted beam is retroreflected by a mirror on another surface of the body, back to the partially reflective surface. An output beam is provided by the retroreflected beam. The DRUM deflector may be part of a system which provides a tracking beam of a wavelength different from the scanning beam which is reflected from the partially reflecting surface, then acting as a dichroic beam splitter. A dichroic beam combiner combines light of both wavelengths and directs the light to be incident on the dichroic, partially reflecting surface of the DRUM deflector. A spherical mirror with a clock grating reflects the tracking beam to a photodetector to provide an output signal from which in-scan tracking errors can be derived.

45 Claims, 14 Drawing Sheets

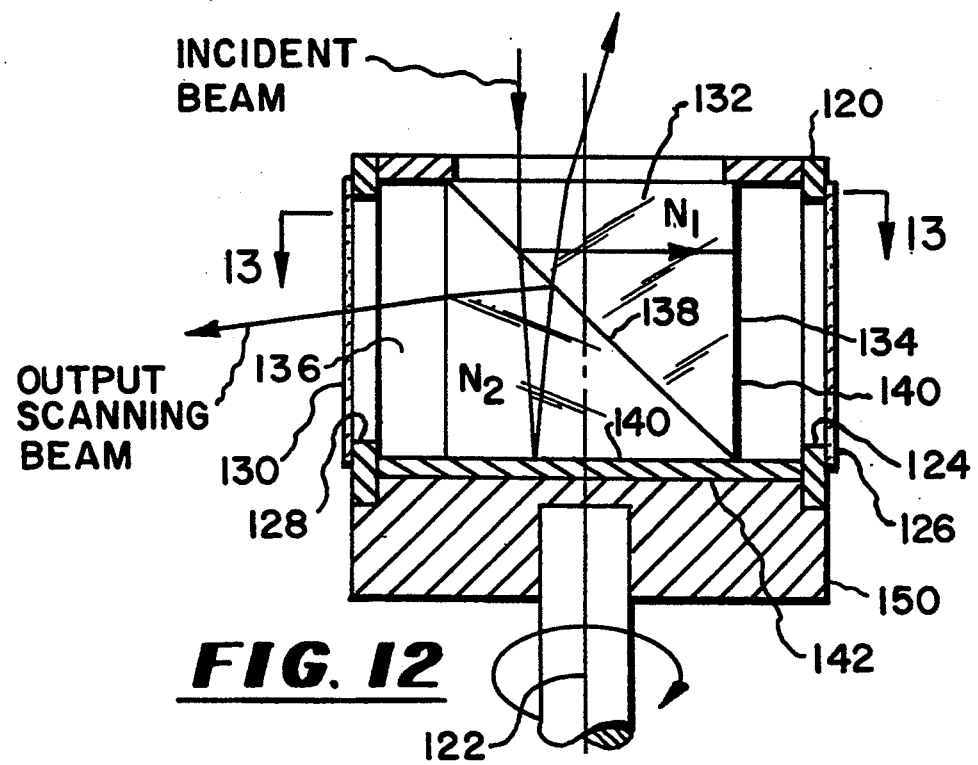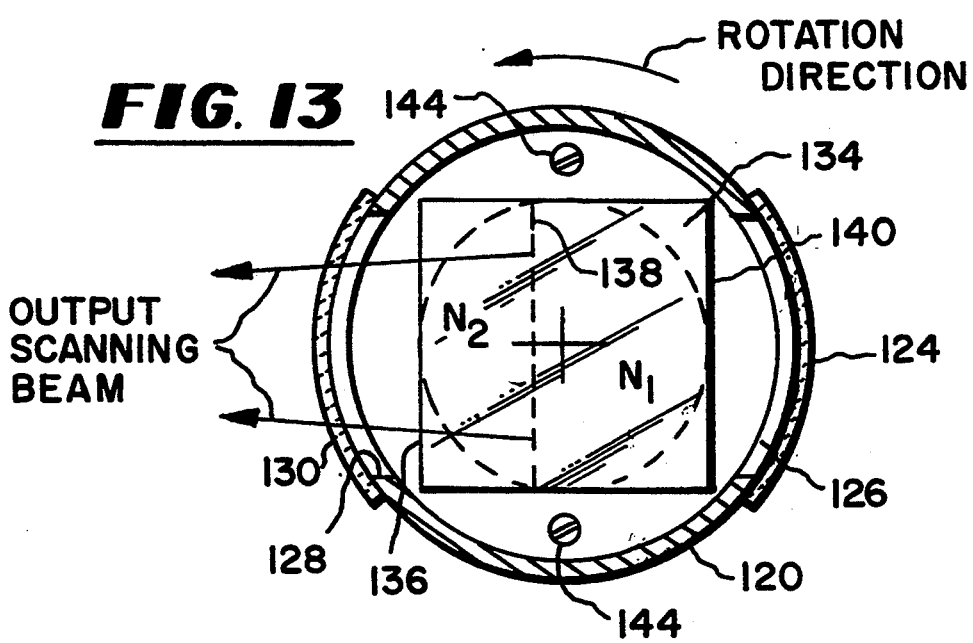

ROTATIONALLY SYMMETRIC DUAL REFLECTION OPTICAL BEAM SCANNER AND SYSTEM USING SAME

This invention relates to optical beam scanners and deflectors and systems which direct the beam with high accuracy and without cross-scan positioning errors and thereby provide improved reprographic apparatus (image writers or printers) especially of the internal drum type.

BACKGROUND

Advances in image processing software and hardware have created a demand for graphic arts electronic imaging systems that are capable of reading or writing high quality images at high data rates. Electronic image writing systems are predominantly required to generate repetitive collinear straight lines with good pixel-to-pixel uniformity and no pixel dropouts. The image writing device of choice for these performance requirements is a flying spot laser scanning system, since the beam can be focused to a fine spot to achieve the high pixel density required for high-resolution imaging applications and the intensity of only a single source need be controlled. Most flying spot laser scanning systems are based on either a galvanometer, a rotating penta prism, a rotating polygonal mirror, a rotating holographic optical element (hologon), or an acousto-optic or electro-optic deflector.

Rotating mirror beam deflector systems did not initially meet the requirements for graphic imaging applications because of facet-to-facet non-uniformities and/or spinner wobble. The problem with mirror facets is that they double every error, whether it be deflector wobble, facet pyramidal alignment error, or facet surface nonflatness. Thus, a single faceted rotating mirror beam deflector, termed a monogon or monofacet, suffers from cross-scan beam error due to changes in the fixed mirror wobble angle caused by motor bearing inaccuracies and/or vibration. U.S. Pat. No. 4,475,787 issued Oct. 9, 1984 to Starkweather shows that cross-scan beam error due to these deflector deficiencies can be eliminated in a preobjective deflector system (scan lens follows deflector) if the light undergoes two reflections in the deflector element. Starkweather shows that this reflection condition is achieved by using a rotating penta prism, penta mirror, right angle prism or right angle mirror monogon.

The rays emerging from the penta prism maintain their angular orientation independent of the angular change in the penta prism fixed wobble angle since the rays undergo two reflections within the penta prism deflector. These two reflections occur from reflecting surfaces which are rigidly coupled to each other and, therefore, experience the same angular deviation as the entire penta prism orientation is changed so that parallel rays emerging from the penta prism are focused by a lens after the deflector to a single point at the focal plane of the lens, which in a recording (printers) system is made coincident with the surface at which the recording media is located.

U.S. Pat. No. 4,853,709 issued Aug. 1, 1989 to Stein et al., shows a penta prism deflector in an internal drum imaging system. The penta prism deflector is used in the postobjective mode (focusing lens before deflector), and offset displacement introduced into the position of the emerging rays from the penta prism due to the change in the penta prism wobble angle, introduces a corresponding offset displacement in the scan beam position (cross-scan beam error) at the image recording plane.

One drawback with the two reflection monogon and penta prism method is that each mirror surface of the device must be about twice as flat as that used in the single reflection surface monogon in order to achieve the same wavefront accuracy. If an average wavefront accuracy of $\lambda/4$ is needed, each mirror surface must be made to a surface accuracy of approximately $\lambda/16$, which is expensive. Other major disadvantages of the penta prism deflector include: rotationally nonsymmetric optical and mass geometry that presents problems in a rotating environment, and a fairly large deflector mass that can contribute significantly to inducing dynamic changes in deflector wobble angle. Dynamic change in deflector wobble is still a concern in the penta prism deflector because even though its cross-scan beam error is essentially insensitive with regard to this change, its in-scan beam error (jitter) is directly proportional to change in the in-scan component of deflector wobble.

The rotationally nonsymmetric geometry of the penta prism deflector makes it essentially impossible to obtain dynamic balance in all planes of the deflector. This inability to balance out each deflector plane makes it very difficult to operate the deflector at high rotation rates since the deflector assembly is very prone to vibration problems as a function of change in deflector rotation rate. For example, a penta prism deflector assembly in which mass (a mounting hub) may be added to the assembly to make the assembly more rotationally mass symmetric and while improved with respect to mass symmetry when compared to the penta prism alone still has residual mass asymmetry and, therefore, cannot be completely dynamically balanced for each deflector assembly plane. Also, there is more mass than the initial penta prism deflector which adds considerably to the size, complexity and cost of the deflector motor, and limits speed of rotation of the deflector.

Centrifugal-force-induced deflector element flatness distortion is a problem in mirror deflectors used at high rotation rates. This is particularly true for the penta prism deflector element due to the presence of the two reflecting surfaces and the asymmetric arrangement of those reflecting surfaces with respect to the deflector rotation axis. The second reflecting surface of the penta prism is particularly susceptible to centrifugal-force-induced flatness distortion because it is located at a relatively large distance from the rotation axis and is supported on only one side.

Several other variations of the two reflection deflector principal have been proposed and/or developed. McGrath U.S. Pat. No. 4,934,780, issued Jun. 19, 1990 shows that the two reflection principle can be achieved in a deflector shaped in the form of a 90°-45°-45° prism rotated about an axis that bisects the 90° apex prism angle. With this deflector configuration one achieves mass rotation symmetry and two scans per rotation. Unfortunately, this deflector configuration is not optically symmetric and does not have the incident beam collinear with the deflector rotation axis and, therefore, cannot be used for internal drum imaging applications. Also, it requires a large prism member relative to the optical aperture requirement, and it is not well-suited for operation at high rotation rates.

Articles by G. F. Marshall SPIE Proceedings, Vol. 1454 Beam Deflection & Scanning Technologies (1991), page 37 and Laser Focus World, Vol 27, p.167 (May 1991) describe what is called a butterfly scanner which utilizes two reflections, is mass rotationally symmetric, and produces two scans per rotation. This deflector like the 90°-45°-45° prism is optical nonsymmetric, and the incident beam is noncollinear with the rotation axis. Thus the butterfly deflector cannot be used for internal drum imaging systems. It also requires a large deflector element relative to the optical aperture requirement and is not suited for operation at high rotation rates.

An article by L. Beiser in SPIE Proceedings, Vol. 1454, p. 33 (1991) describes what the author terms an open-mirror monogon scanner that utilizes two reflections to make its cross-scan beam error insensitive with regard to deflector wobble. This deflector has neither optical or mass symmetry, but does have the incident beam collinear with the deflector rotation axis. While this deflector configuration may have a lower mass than a penta prism deflector for the same optical aperture requirement, it suffers from most of the problems that hindered the performance of the penta prism deflector for high rotation rate applications; i.e., balancing problems and centrifugal-force-induced deflector element flatness distortion which translates into optical scan beam distortion.

Tashiro, Japanese Patent Publication 2-226111 of Sep. 7, 1990, describes a two reflection, polarization sensitive, monofacet beam deflector (see FIG. 1) that incorporates a polarizing beam splitter cube, a quarter-wave retardation plate 12 and a high reflecting mirror surface 14. The incident P polarized beam enters the beam deflector element through its top surface and propagates to the polarization sensitive beam splitter reflecting surface 16 that is sandwiched between two essentially identical 45 degree right angle prism elements 18 and 20. This polarization sensitive beam splitter reflecting surface has the property that, at a specific wavelength, it transmits virtually 100 percent of P polarized light while reflecting virtually 100 percent of S polarized light.

After passing through the polarization sensitive beam splitter reflecting surface 16, the P polarized incident beam propagates through the quarter-wave plate 12 to the mirror surface 14. The quarter-wave plate and reflecting mirror surface are orientated perpendicular to the incident beam propagation direction and, therefore, the incident beam is retroreflected back on itself. For illustration purposes, the retroreflected beam 22 in FIG. 1 is shown as propagating at a small angle with respect to the incident beam propagation direction.

Due to the retroreflection condition, the incident beam effectively propagates through the quarter-wave plate 12 twice, thereby experiencing the phase retardation associated with a half-wave plate. When the quarter-wave plate is oriented with its optical axis at 45 degrees to the incident beam polarization direction, the retroreflected beam emerging from the quarter-wave plate will be orthogonally polarized with regard to the incident beam polarization direction (P-in-S out) as shown in FIG. 1. The S polarized retroreflected beam propagates back to the polarization sensitive beam splitter reflecting surface 16 where it is essentially totally reflected in a direction perpendicular to the deflector rotation axis 24 and emerges from the deflector element as the output scanning light beam. In Tashiro's description of this deflector configuration, the output scanning beam enters an F-Theta scan lens and is imaged to a flat image plane.

While the polarization beam splitter and quarter-wave retroreflector arrangement enables the Tashiro device to achieve virtually 100 percent radiometric throughput efficiency, the arrangement introduces a number of performance problems and restrictions with regard to imaging system applications.

A major performance problem associated with the Tashiro deflector configuration is that the polarization sensitive beam splitter reflecting surface and the quarter-wave plate in this deflector assembly are very wavelength dependent with regard to their intended operating characteristics and, therefore, the deflector can only be utilized with a monochromatic light source. This wavelength restriction prevents this deflector from being used for color image recording applications requiring multi-wavelength light sources to write on color photographic film. Even when used with a monochromatic light source, the output scanning beam intensity from this deflector varies as a function of relative changes in the incident beam polarization state.

It is evident from the preceding description of the polarization sensitive beam splitter reflector surface 16 in FIG. 1 that P polarized light is virtually 100 percent transmitted while S polarized light is virtually 100 percent reflected and, therefore, the scan beam intensity is very dependent on the initially incident beam polarization state. Also, this polarization sensitivity property of the deflector produces scan beam intensity variation as a function of the deflector rotation angle, $\theta_R$, when a linearly polarized light source is used with the deflector. The relationship between scan beam intensity, I, and deflector rotation angle is:

$$I = I_S \sin^2 \theta_R + I_P \cos^2 \theta_R, \quad (1)$$

where $I_S$ and $I_P$ are, respectively, the intensities of the S and P polarization components of the incident beam. When deriving Equation (1) it was assumed that the radiometric throughput efficiency of the deflector was essentially 100 percent for P polarized light when $\theta_R = 0$, as depicted in the FIG. 1 deflector configuration.

Equation (1) shows that the scan beam intensity for the FIG. 1 deflector configuration decreases as $\cos^2 \theta_R$. This scan beam intensity decrease with deflector scan angle is not a significant problem for flat-field imaging systems since F-Theta scan lens considerations usually limit deflector rotation angle to a maximum of ±27 degrees and, therefore, the intensity fall-off can be compensated for by electronically changing the modulation intensity of the scan beam as a function of scan angle. However, this scan beam intensity fall-off with scan angle is a significant problem for internal drum imaging systems because the majority of these systems use deflector rotation angles of between ±85 and ±135 degrees.

Tashiro proposes to rotate the laser light source with the deflector assembly as a way to solve the problem of the scan intensity decreasing as a function of deflector rotation angle. This solution is not practical in most imaging applications, particularly those requiring a high deflector rotation rate. In addition, rotation of the laser source with the deflector assembly makes the cross-scan beam error of the laser/deflector assembly sensitive to changes in assembly wobble angle and, thereby, effectively cancels the scan beam error performance achieved by having two reflections within the deflector element.

Other device properties that militate against the use of the Tashiro deflector configuration for internal drum imaging applications include problems associated with utilizing this deflector in the postobjective mode and the perpendicularity of the scan beam with regard to the deflector rotation axis. Both the polarization sensitive beam splitter reflecting surface and the quarter-wave plate are very incident angle dependent with regard to their intended operating characteristics and, therefore, are limited for use with essentially a collimated incident beam. This beam collimation condition precludes the use of this deflector in the postobjective mode, thereby complicating its incorporation into internal drum imaging systems.

It is desirable in an internal drum imaging system to have the scan beam be slightly offset from being perpendicular to the rotation axis so that the retroreflected specular light from the internal drum image surface does not propagate back along the incident beam and cause ghost scan beams and laser intensity instability. For the internal drum imaging configuration, scan-line straightness and image spot velocity uniformity are independent of the angle that the scan beam makes with respect to the deflector rotation axis. These imaging parameters depend on the accuracy of the concentricity between the deflector rotation axis and the internal drum recording surface. A five degree deviation angle between the scan beam and image surface normal is often selected because this ensures that retroreflected specular light from the image surface does not reenter the focusing lens, even for the largest designed scan beam ray cone angle. Image resolution is degraded by utilizing too large of a deviation angle between the image surface normal and the scan beam principal ray. This degradation occurs because the image spot becomes elliptically shaped in the cross-scan direction and because of an increase in image flare associated with multiple reflection of the skewed incident scan beam within the recording medium.

All of the previously described two reflection deflectors have very poor aerodynamic forms which can, at high rotation rates, introduce significant air turbulence into the scan beam path. This air turbulence can significantly increase the scan jitter of the system and, therefore, the deflector element is usually enclosed in an aerodynamically smooth housing. See U.S. Pat. No. 4,662,707 issued to Teach, et al. on May 5, 1987 and U.S. Pat. No. 4,988,193 issued Jan. 29, 1991 to Cain. The addition of this aerodynamic housing usually introduces other unwanted optical properties into the system.

Reference may be had to C. J. Kramer, U.S. Pat. No. 4,852,956 for a nondisc plane diffraction grating (NPDG) monofacet deflector providing accurate, essentially no cross-scan beam tracking error and which can be used in internal drum and flat-field imaging applications. This grating facet redirects the incident laser beam propagating along the deflector rotation axis so that it exits the deflector unit approximately perpendicular to the rotation axis. Rotation of the deflector unit causes the redirected beam from the deflector to scan through an angle that is equal to the deflector rotation angle. Following the grating facet in FIG. 6 of the Kramer Patent is a single element lens that rotates with the deflector unit, thereby enabling the deflector unit to generate high resolution images on the inside surface of a drum. The stationary F-Theta scan lens following the deflector unit in FIG. 7 of the Kramer Patent images the scan beam from the unit to a scanning spot that generates a straight scan line on a flat imaging surface. NPDG deflectors can be substituted for the bulky penta prism deflectors used in many imaging applications. These NPDG deflectors are significantly less affected by centrifugal-force-induced optical beam distortion than penta prism deflectors because the NPDG deflectors function in transmission. Also, the optical and mass symmetry of the NPDG monograting deflector unit enables it to be easily driven to very high rotation rates. However, grating based deflectors require very monochromatic light sources and laser diodes, now commercially available, are not suitable for use with these deflectors due to wavelength shifts associated with mode hopping in these lasers.

SUMMARY OF THE INVENTION

In accordance with the invention, a dual reflection monofacet beam deflector is provided that is well-suited for both flat-field and internal drum, high resolution imaging systems and is also suited for use with multi-wavelength light sources for color image recording on color photographic film. This deflector (which may also be called a scanner) has rotational symmetry about its axis of rotation. The invention provides a cube beam deflector which has the cross-scan beam error performance achieved with the penta prism deflector while having a scanning beam intensity that is virtually insensitive to changes in the incident beam polarization state, wavefront divergence and operating wavelength. Thus, it is suitable for use with laser diode light sources.

Briefly described, the invention provides a dual reflection unpolarizing monofacet (DRUM) beam deflector, in accordance with a principal embodiment thereof. A reflector within a monogon provides two reflections of the incident beam internally thereof. Although the radiometric throughput efficiency of the deflector is reduced because of one of the reflected beams not being used, a high radiometric throughput efficiency is not of prime importance in many laser image recording applications. Even the lowest power lasers have approximately ten times more power than required to expose the silver halide based photosensitive materials used in the majority of current high resolution image recording systems. The excess laser power in these image recording systems is not used in any event and is stopped from striking the imaging plane by means of a neutral density filter placed in the laser beam path. Reducing the radiometric throughput efficiency of the deflector unit from approximately 90 to 20 percent would normally only require a change in value or the elimination of the energy reducing neutral density filters which have heretofore been used in these recording systems. There are two reflections of the output beam, which is used for recording, thereby providing accurate, error-free cross scan performance as with a penta prism, for 360° about the rotational axis thereby providing an ideal deflector for internal drum applications.

BRIEF DESCRIPTION OF THE DRAWINGS

FIG. 12 is a front, sectional view of a DRUM reflector similar to the deflector shown in FIG. 10, but having a counterbalancing port and window.

FIG. 13 is a sectional view of the deflector shown in FIG. 12 taken along the line 13—13 in FIG. 12.

DETAILED DESCRIPTION

Figure 2:
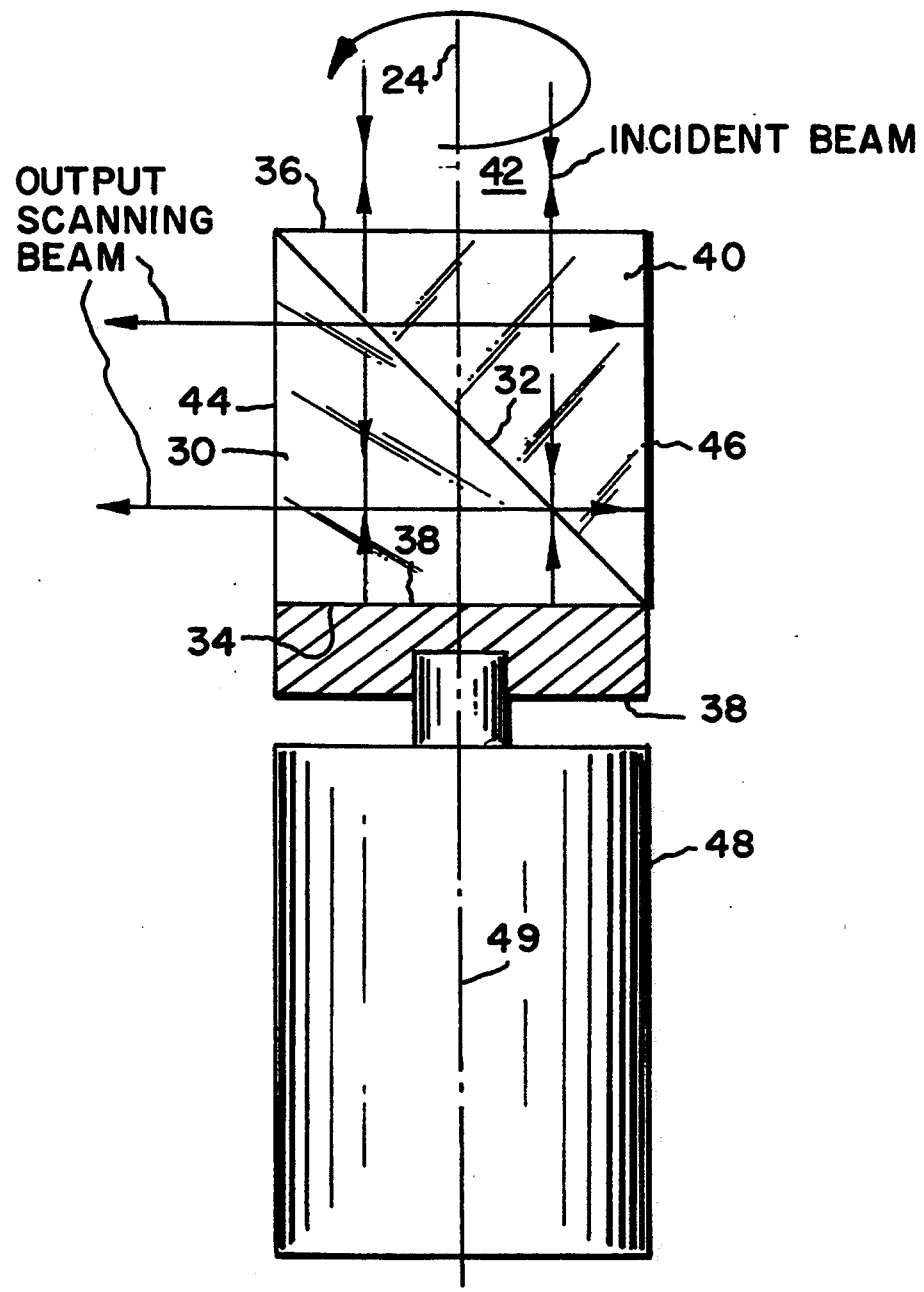
FIG. 2 is a sectional front view of a cube dual reflection unpolarizing monofacet (DRUM) cube beam deflector in accordance with an embodiment of the invention.

The drum cube beam deflector in FIG. 2 has two essentially identical 45 degree right angle prism elements with their hypotenuse faces cemented together to form the cube deflector element 42. Preferred material for fabricating the right angle prism elements 30 and 40 is an optical quality glass such as BK-7. Glass is very rigid for its weight, extremely stable and is readily fabricated into high quality optical components. These right angle prism elements may alternatively be fabricated utilizing optical quality plastic materials such as methyl methacrylate. While plastics are not as mechanically and thermally stable as glass or as easily fabricated into high quality optical components as glass, their density (approximately 1.2 g/cm$^3$) is about half that of BK-7 glass (which is approximately 2.51 g/cm$^3$) which is a desirable property for a high rotation rate monogon beam deflector.

Prior to cementing the right angle prism elements together, a partial reflecting film 32 is deposited onto one of the hypotenuse's faces. This partial reflecting film may be a metal coating, a multi-layer dielectric coating or a metal dielectric hybrid coating. Partial reflecting metal coatings are relatively inexpensive to manufacture but have relatively high absorption (about 20 percent). Partial reflecting multi-layer dielectric coatings have very low absorption but are normally more expensive than the metal coating and can have quite different performance characteristics for S and P polarized light unless limited for use at one laser wavelength. Partial reflecting metal dielectric hybrid coatings are usually less expensive than multi-layer dielectric coatings and can provide essentially equal reflected and transmitted portions of incident light with only about 10 percent absorption, while having fairly small differences in performance for S and P polarizations over an extended wavelength range. Also, the metal and metal dielectric hybrid coatings are fairly insensitive to changes in the angle of the incident beam.

A broad spectral bandwidth metal or metal dielectric hybrid film 32 is presently the preferred optical coating for the beam splitter reflector surface in the DRUM cube beam deflector because when compared with multi-layer dielectric coatings they are less expensive to deposit and more importantly because they are less sensitive to changes in the incident beam polarization state, wavefront divergence, incidence angle, and operating wavelength. These beam splitter performance properties indirectly reduce deflector manufacturing costs by enabling standardized deflector sizes to be used for a number of different imaging applications. Also, as previously noted, insensitivity of the radiometric throughput efficiency of the deflector to relative changes in the incident beam polarization state is more important in most high resolution imaging systems, particularly internal drum systems, than maximizing the radiometric throughput efficiency of the deflector. It is anticipated that for most image recording applications the beam splitter reflector surface should provide essentially equal reflected and transmitted portions of the incident beam and have fairly small differences in performance for S and P polarization states.

Prior to cementing the right angle prism elements together, a high reflecting coating 34 is deposited onto what will be the bottom surface (surface opposite incident beam surface 36) of the assembled cube deflector element 42. This high reflecting mirror surface is preferably a broad spectral bandwidth metal, multi-layer dielectric, or metal dielectric hybrid coating. The beam is essentially normally incident to this mirror surface and, therefore, the reflectance characteristics of the mirror surface are essentially independent of relative changes in the incident beam polarization state. For single laser line scanning applications, non-polarizing, narrow spectral bandwidth multi-layer dielectric coatings can be used for both the beam splitter reflector 32 and high reflecting mirror 34 surfaces in the DRUM cube beam deflector of FIG. 2, thereby reducing the radiometric absorption losses of the deflector assembly.

It is desirable that the reflective mirror film 34 have very good adhesion to the right angle prism element. The cube deflector element 42 is attached to a mounting hub assembly 38 with a glue bonding material such as epoxy. This bonding material is primarily sandwiched between the bottom mirror reflecting surface 34 of the cube deflector element 42 and the top surface 38 of the mounting hub assembly. The strength of the finished bond is dependent on the adhesion strength of the reflective mirror film 34 to the prism 30 material. Some of the glue bonding material may be placed a short distance up the sides of the cube deflector element 42 from its bottom surface, thereby increasing the bonding surface area. Except for the incident beam surface 36, the output scanning beam surface 44, and the reflective mirror surface 34, all other exterior surfaces of the cube deflector element can have a fine ground finish which helps with the adhesion of the glue bonding material.

Anti-reflection coatings are used on the incident beam and output scanning beam surfaces 36 and 44 of the cube deflector element 42 to both reduce their reflection losses and reduce ghost scan beams associated with specular retroreflected light from these surfaces. A black carbon based paint having an index of refraction very close to that of the cube deflector element material provides a coating 46 for the back surface (surface opposite output scanning beam surface) of the DRUM cube deflector element 42. Internal glass reflection from such a painted glass surface 46 is less than 0.1 percent.

While the prime function of the mounting hub assembly 38 is to rigidly couple the cube deflector element to a deflector spinner motor 48, it also functions as the final balancing element for the deflector unit. This mounting hub can be fabricated as either a metal or plastic part. Using a hub made of stainless steel similar to that used in the deflector motor rotor provides for a good press fit of the hub onto the rotor and facilitates the use of stainless steel balancing screws within the hub assembly. An aluminum mounting hub may be used. Aluminum is approximately three times lighter than stainless steel, which is an important consideration for high speed deflector operation. Balancing of an aluminum hub/deflector assembly can be performed utilizing stainless steel balancing screws, or by removing material from the hub assembly. A fiber filled plastic material may also be used for the mounting hub since this material is both strong and durable while having half the weight of aluminum. Material removal by means of laser ablation is a very accurate and economical method for dynamically balancing the rotating hub assembly.

Cementing of the two right angle prism elements 30 and 40 together to form the DRUM cube beam deflector element 42 is preferably accomplished using a high-strength optical cement that has low shrinkage and some resiliency of adhesive so that strain within the finished cube deflector is minimized. Norland Products Inc. of New Brunswick, N.J., USA makes U.V. light curing optical cements which are claimed to meet the above-stated cement characteristics. Norland type 61 adhesive is recommended for precision optical bonding. Electronic Materials Inc. of New Milford, Conn., USA makes U.V. light cured epoxy cements which they claim have lower shrinkage than the Norland type adhesives.

Consider next the optical imaging properties of the DRUM deflector 42. The incident central beam ray is collinear with the deflector rotation axis 49 and enters the deflector element via its top surface 36 which is the deflector entrance window. When the deflector element is a cube structure, the entrance window is also the deflector entrance aperture. After entering the deflector the incident beam propagates to a 50 percent beam splitter provided by the reflector surface 32 which equally divides the incident beam into reflected and transmitted beams. If the beam splitter reflector surface 32 has negligible absorption, then approximately 50 percent of the incident beam energy is present in both the reflected and transmitted beams.

The reflected beam propagates to the back black painted surface 46 of the deflector element and is essentially totally absorbed, while the transmitted beam propagates to the bottom highly reflective mirror surface 34 of the deflector element 42 where it is essentially totally retroreflected. This retroreflected beam is collinear with the incident beam and, therefore, propagates back to the 50 percent beam splitter reflector surface 32 which equally divides this retroreflected beam into reflected and transmitted beams. The reflected part of the retroreflected beam propagates to the output window (front surface 44) of the deflector element 42 and emerges from the deflector as the output scanning beam, while the transmitted part of the retroreflected beam is collinear to the incident beam and propagates back to the light source as the transmitted retroreflected beam.

The output scanning beam is perpendicular to the deflector rotation axis 49. This perpendicular condition is achieved because the inclusion angle between the beam splitter reflector 32 and mirror reflecting surface 34 is 45 degrees and because the incident beam is parallel to the deflector rotation axis. Having the output scanning beam perpendicular to the deflector rotation axis is important for flat-field imaging applications, since it ensures a straight scan-line. If the output scanning beam in a flat-field system makes an angle, $\theta_z$ with respect to the plane that is perpendicular to the deflector rotation axis 49, the scan-line departs from a straight line by the value $\Delta Z$, which is given by:

$$\Delta Z = (\sqrt{X^2 + Y^2} - Y)\mathrm{TAN}\theta_z \tag{2}$$

where X is the displacement of the scan beam from the center of the image plane and Y is the focal length of the focusing lens for the preobjective deflector case, or is the distance from the deflector axis to the center of the image plane when no lens follows the deflector. Straightness of scan-line in an internal drum imaging system is not determined by the angle that the output scanning beam makes with the deflector rotation axis. Scan-line straightness for this case is determined by the concentricity between the deflector rotation axis 49 and the internal drum recording surface.

If the beam splitter reflector 32 has negligible absorption, then approximately 25 percent of the initial incident beam energy is present in both the output scanning and transmitted retroreflected beams. By sacrificing 75 percent or more of the incident beam power, the beam deflector unit 42 achieves a major performance advantage *in providing a rotationally symmetric, dual reflection monofacet beam deflector having both a cross-scan beam*

*angle that is insensitive with regard to changes in the deflector wobble angle and a scanning beam intensity that is virtually insensitive to changes in the incident beam polarization state, operating wavelength and wavefront divergence* (italics for emphasis).

Examination of the cube beam deflector assembly of FIG. 2 reveals that this mechanically simple deflector assembly is essentially totally rotationally symmetric with respect to the deflector rotation axis 49 and, therefore, the assembly is easy to dynamically balance for a broad range of operating speeds, including high rotation rates (e.g., about 20K RPM). Both the rotational symmetry and orientation of the reflecting surfaces 32 and 34 in this deflector assembly 42 reduce the sensitivity of these reflective surfaces to centrifugal-force-induced flatness distortion at high rotation rates. The reflecting surface 34 is perpendicular to the deflector rotation axis and is therefore virtually invariant to centrifugal-force-induced changes in reflector surface flatness. Centrifugal-force-induced flatness distortion does occur in the 50 percent beam splitter reflector element 32, but this flatness distortion essentially does not degrade beam optical wavefront quality for rotation rates of less than 20,000 RPM and deflector optical aperture sizes of 25 mm or less, in that the beam splitter reflector surface 32 is sandwiched between essentially identical mass elements which are centered on the deflector rotation axis 49. Therefore, most of the important central portion of the beam splitter surface 32 which is in the path of the beam experiences relatively little differential centrifugal force.

As is the case with the penta prism, the scan beam rays emerging from the deflector 42 maintain their cross-scan angular orientation independent of the cross-scan angular change in the deflector wobble angle. As was the case with the penta prism deflector, changes in cross-scan deflector wobble angle can introduce an offset displacement in the cross-scan direction of the scan beam emerging from the cube deflector assembly of FIG. 2. This ray offset displacement has no effect on the cross-scan error performance of preobjective deflector systems nor does it degrade the image quality of postobjective deflector systems for normal deflector motor 48 operation.

When a cross-scan angular change occurs about the center of the DRUM cube deflector element 42, there is virtually no ray offset displacement in the scan beam, even for relatively large angular changes. When a cross-scan angular change occurs about a point located on the deflector rotation axis just below the high reflecting mirror surface 34 of the DRUM cube deflector 42, there is approximately a 0.2 um offset displacement in the output scanning beam, based on a 25 mm cube aperture size and a 3 arc second rotation angle. Three arc seconds is the maximum expected change in deflector wobble due to deflector motor assembly deficiencies and, therefore, ray offset displacement associated with these deficiencies will have negligible effect on the quality of postobjective scanning systems incorporating the cube deflector 42.

Total rotational symmetry of the imaging properties of the scanning beam rays emerging from the deflector assembly 42 is achieved by having the central incident beam ray be collinear with the deflector rotation axis and by having the deflector element be centered on the deflector rotation axis. Under these conditions, the incident beam maintains a constant angle of incidence with the optical surfaces of the deflector 42 and, therefore, scan beam angle is equal to deflector rotation angle. Deflector rotation angle is provided by the deflector spinner motor 48, which can be either an AC hysteresis synchronous or brushless DC type motor employing either air bearings or ball bearings.

A fixed deflector wobble angle does not contribute to either the cross-scan or the in-scan tracking error for a monofacet deflector system because any resulting variation in scan beam position is the same for each scan-line. A fixed in-scan deflector wobble angle causes a corresponding offset in the scan beam angle for the deflector geometry illustrated in FIG. 2. This offset angle remains constant with scan position and, therefore, is readily compensated for by using a start-of-scan detection signal to synchronize the start of scan line pixel data, as is conventional in image-setters now in use.

Change in the in-scan component of fixed deflector wobble angle causes an equal corresponding angular change in both the deflector element rotation angle and scan beam angle. Therefore, while changes in the fixed deflector wobble angle have only negligible influence on the scan beam tracking error performance of the DRUM cube deflector system 42, these changes can contribute significantly to the in-scan jitter performance of the system. Thus changes in the deflector wobble that contributes to in-scan jitter error should be minimized. This is accomplished by reducing the vibrations in the deflector motor assembly that cause change in the deflector wobble angle. This vibration minimization is accomplished by precisely balancing the deflector motor assembly and avoiding play in the rotor/bearing assembly used in the motor 48. Reducing the mass of the deflector unit contributes significantly to minimizing dynamic changes in deflector wobble angle for high speed rotation conditions.

Consider the case where residual deflector motor deficiencies for a ball bearing equipped motor cause a maximum change in the in-scan deflector wobble angle of about 3 arc seconds, the corresponding in-scan positional beam error for the deflector 42 would be 1.5 um when the deflector is used in an internal drum imaging system having a radius of 100 mm. A 7.3 um in-scan beam displacement error is achieved for a 3 arc second wobble change when this deflector is used in a flat-field imaging system incorporating an F-Theta scan lens having a 500 mm focal length.

Scan beam jitter error associated with deflector motor hunting is normally more of a problem with monofacet deflectors than with their multifacet equivalent. This is because the monofacet usually has less inertia of rotation as a result of having a significantly smaller deflector diameter. Motor hunting causes a slow variation in the in-scan jitter that can be compensated for by using a variable pixel clock rate. The monofacet deflector 42 can be equipped with a shaft encoder to measure the variation in deflector motor speed associated with motor hunting. Shaft encoder data can be used alone or in conjunction with a start-of-scan detector signal to calculate the change in the pixel clock rate required to compensate for the motor hunting component of in-scan jitter.

Variation in scanning beam intensity, due to change in the incident beam polarization state relative to the deflector element 42, is minimized in the deflector element 42 by the type of optical coating used for the beam splitter reflector surface 32 in the deflector, as noted in the description of deflector fabrication methods, and by having the scan beam propagate twice through the partially reflective surface 32. To illustrate the benefit of passing the scan beam twice through the beam splitter surface, consider the example case where: The reflectance/transmittance ratio of the splitter surface is 0.6/0.4 and 0.4/0.6, respectively, for S and P polarized light; The splitter surface 32 has negligible absorption; The incident beam is P polarized with respect to the deflector being at the center of scan position; and The high reflecting mirror surface in the deflector has essentially 100 percent reflectivity. For these parameters, the scanning beam intensity is 24 percent of the incident beam intensity for the center-of-scan position, based on the beam splitter surface transmitting 60 percent of the incident P polarized beam to the mirror reflector and reflecting 40 percent of the retroreflected beam from the mirror reflector into the output scanning beam. When the deflector is rotated 90 degrees from the center of scan position, the scanning beam intensity is still 24 percent of the incident beam intensity, based on the beam splitter surface transmitting 40 percent of the incident S polarized beam to the mirror reflector and reflecting 60 percent of the retroreflected beam from the mirror reflector into the output scanning beam.

It is evident from this example that passing the scan beam twice through the beam splitter surface, compensates for polarization related differences in the reflectance/transmittance ratio of the splitter surface. For the above specified deflector parameters, the output scanning beam intensity will always be 24 percent of the incident beam intensity, independent of incident beam polarization, whether it is linear, circular or elliptical. This independence of scanning beam intensity with regard to changes in the incident beam polarization state, not only improves scan image system performance, but also greatly simplifies the design, fabrication and alignment of the system.

Figure 1:
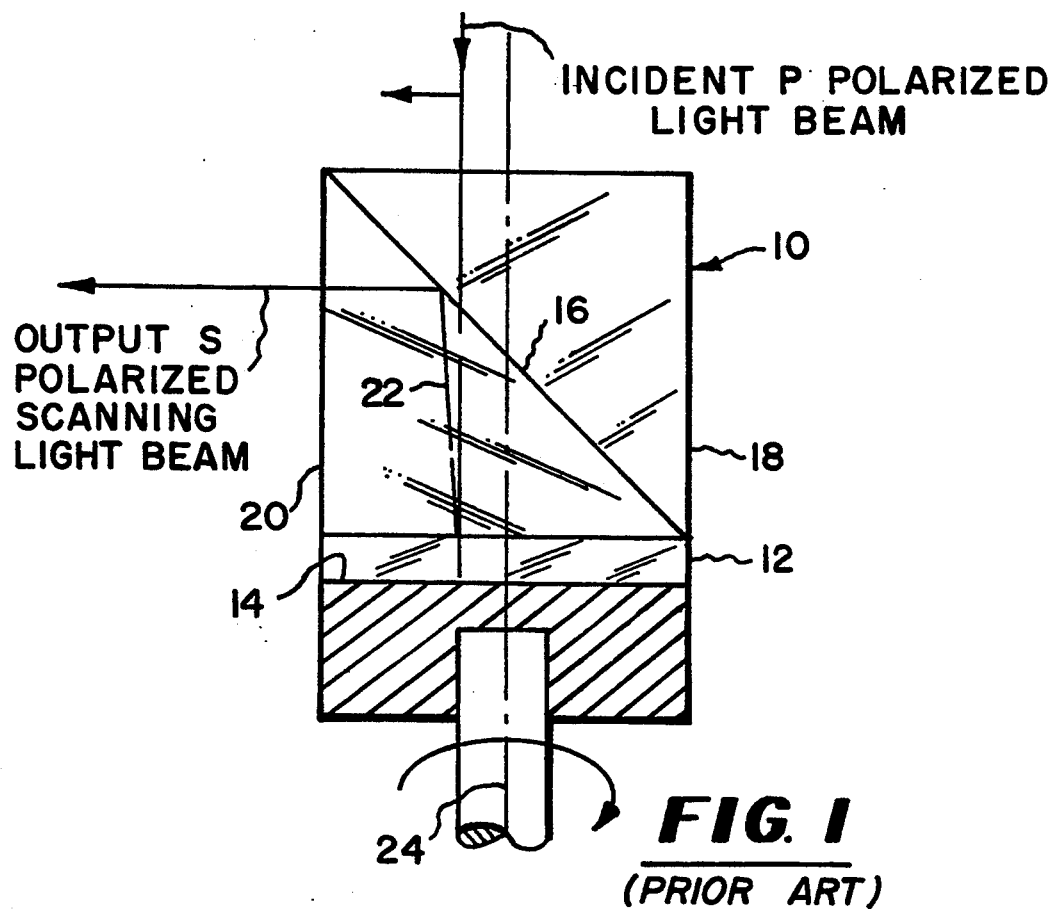
FIG. 1 is a sectional view through the rotational axis of a polarization sensitive beam deflector which is discussed above.
Figure 3:
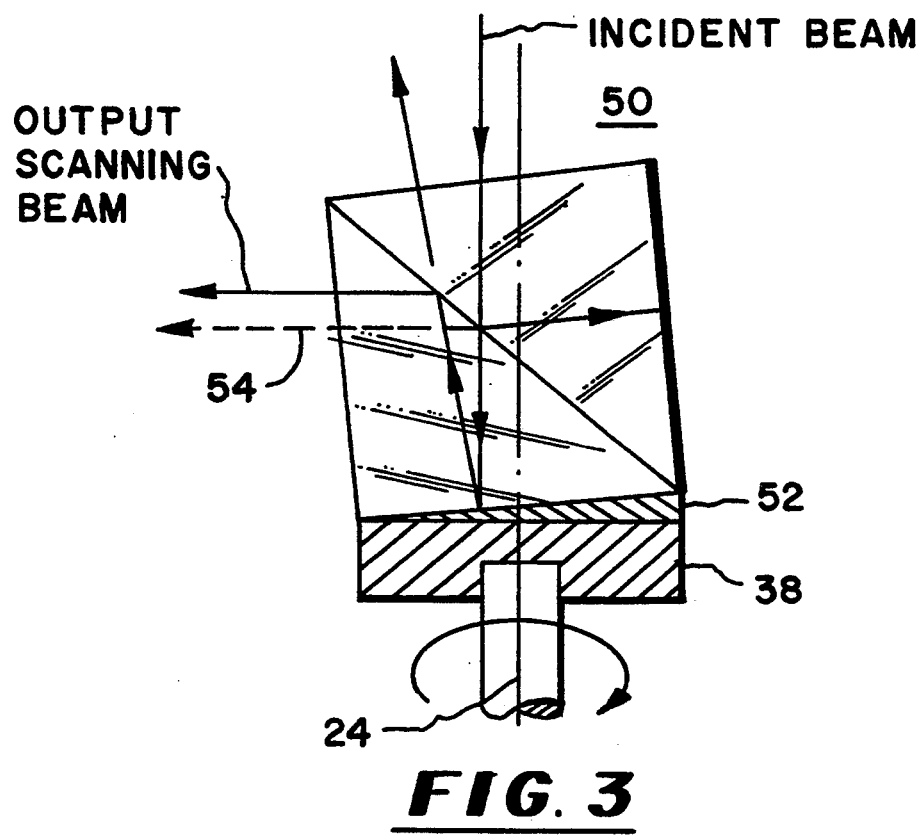
FIG. 3 is a view similar to FIG. 2 of a DRUM deflector having a wedge to provide a tilted reflecting surface.

Referring to FIG. 3, there is shown a DRUM cube beam deflector 50 similar to the deflector 42 wherein the propagation of retroreflected beam back toward the light source (laser) is avoided. The collinear condition between incident and transmitted, retroreflected beams as shown in FIG. 2 may not be desirable because it can cause ghost scan beams and laser intensity instability.

In the deflector 50, a metal wedge member 52 is sandwiched between the bottom of the cube deflector element and the mounting hub assembly. This wedge member 52 tilts the cube deflector element so that the retroreflected beam from the mirror reflecting surface is at an angle with respect to the incident beam. Wedge angle of this member need only be in the range of 1 to 2.5 degrees to cause the transmitted retroreflected beam to be angularly separated by 2 to 5 degrees from the incident beam direction and, thereby avoid causing ghost scan beams and laser intensity instability.

Because the wedge angle requirement is relatively small, the presence of this wedge member and the associated tilting of the cube deflector element does not materially influence the dynamic rotational operating characteristics of the deflector assembly for most applications. The presence of this wedge member 52 has no influence on deflector cross-scan beam angle and only introduces a parallel offset displacement in the output scanning beam, as indicated by the inclusion of the dashed output scanning beam ray 54, which corresponds to the position of the scanning ray when the cube deflector element is not tilted by the wedge member. Even a relatively large, fixed, deflector wobble angle does not cause either a cross-scan or in-scan beam tracking error problem for a monofacet deflector system because any resulting variation in scan beam tracking angle is the same for each scan-line.

The wedge member 52 may also, if desired, be fabricated in either plastic or glass materials, or the wedge angle can be directly machined into the mounting hub element 38. Sufficient wedge angle may be provided by tapering the layer of epoxy cement used to bond the cube deflector element to the mounting hub assembly 38. The taper angle of the cement film can be set by placing a small piece of shim stock under one bottom edge of the cube deflector element, during the cementing process.

Figure 4:
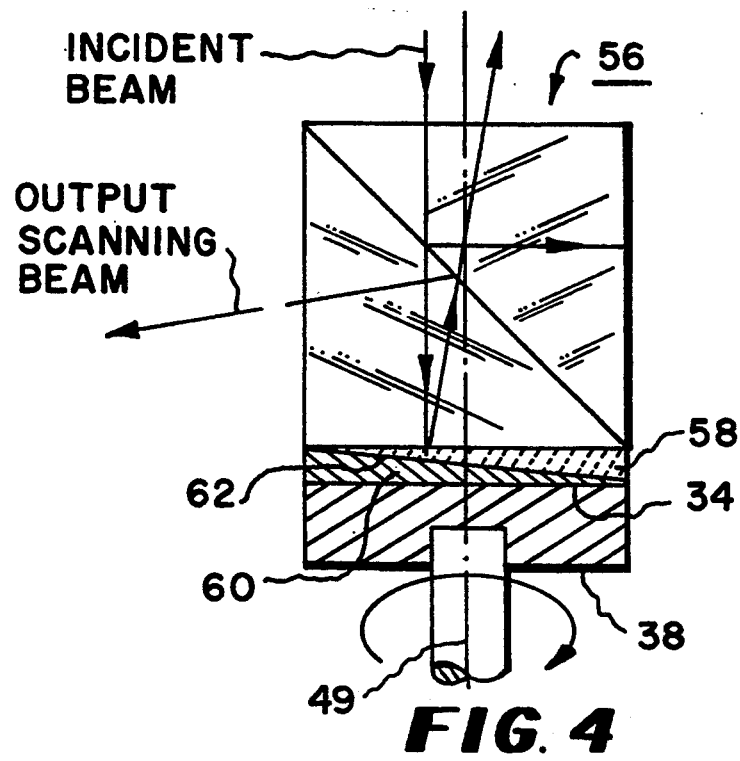
FIG. 4 is a view similar to FIG. 3 of a DRUM deflector having two wedges, one of which provides the reflecting surface.

The beam deflector assembly 56 shown in FIG. 4 uses a glass wedge member 58 that is sandwiched between the bottom of the cube deflector element 56 and a metal wedge member 60 attached to the top of the mounting hub assembly 38. This glass wedge member 58 is optically cemented to the cube deflector element 50. This glass wedge member 58 can be fabricated from the same material used to fabricate the prisms of the cube deflector element 56. Under these conditions, the transmitted incident beam propagates from the cube element into the glass wedge member without experiencing essentially any change in propagation direction, polarization state or intensity levels. The bottom surface 62 of the glass wedge member 58 has a high reflection mirror coating deposited on it.

The glass wedge member 58 retilts the cube deflector element 56 such that its top surface is essentially perpendicular to the deflector rotation axis 49. When the glass and metal wedge members are fabricated from materials having similar densities, the deflector assembly of FIG. 4 achieves virtually total rotational mass symmetry with respect to the deflector rotation axis. While achieving rotation symmetry is desirable, the main reason for attaching the glass wedge member to the cube deflector element is to alter the 45 degree inclusion angle between the beam splitter reflector and mirror reflecting surface. Having this inclusion angle not be 45 degrees results in the output scanning beam being non-perpendicular to the deflector rotation axis when the incident beam is parallel to the rotation axis 49. The metal wedge member 60 compensates for the glass wedge member and brings the transmitted retroreflected beam out of parallelism with the incident beam.

It is desirable that the output scanning beam be non-perpendicular to deflector rotation axis for internal drum imaging applications, then the retroreflected specular light from the internal drum image surface does not propagate back along the incident beam and cause ghost beams and laser intensity instability. Specular retroreflected light from the image plane is more of a problem in internal drum systems than with flat-field imaging systems, because the deflector in the drum system is concentric to the recording surface and, therefore, the output scanning beam is always perpendicular to the recording plane when the scan beam is perpendicular to the deflector rotation axis. A five degree deviation angle between the output scan beam and the drum image surface normal can ensure that retroreflected specular light from the image surface does not reenter the scan focusing lens, even for the largest designed scan beam ray cone angle. As previously noted, straightness of scan-line for the internal drum scanning system is determined by the concentricity between deflector rotation axis and drum recording surface and is not dependent on the angle that the scan beam makes with the deflector rotation axis.

Angular deviation of the output scanning beam from a DRUM cube beam deflector and the image surface can also be achieved by optically cementing a small apex angle prism to either the deflector input (top) or output (front) surfaces, but is less preferable, since larger prism apex angles are required to obtain the same beam deviation angle and some rotational mass symmetry is lost, particularly when the prism is placed on the output deflector surface. The wedge can also be directly fabricated into the prisms to achieve the non-perpendicular scanning beam condition.

The back, black painted surface in the deflector elements 42, 50 and 56 absorb virtually 100 percent of the light incident on this surface, thereby eliminating ghost scan beams. Reflections from this back surface can alternatively be minimized by optically polishing and placing an anti-reflection (AR) optical coating thereon. However, AR coatings are considerably more expensive than the black painted coating and the black paint coating has significantly lower reflection than normal commercial multi-layer AR coatings. Also, only a beam blocking approach, such as the proposed painted surface, will work for a deflector assembly used in internal drum imaging systems having greater than about 180 degrees scan angle. Light transmitted through the back of the deflector assembly will expose the recording media for imaging systems utilizing greater than 180 degrees.

Figure 5:
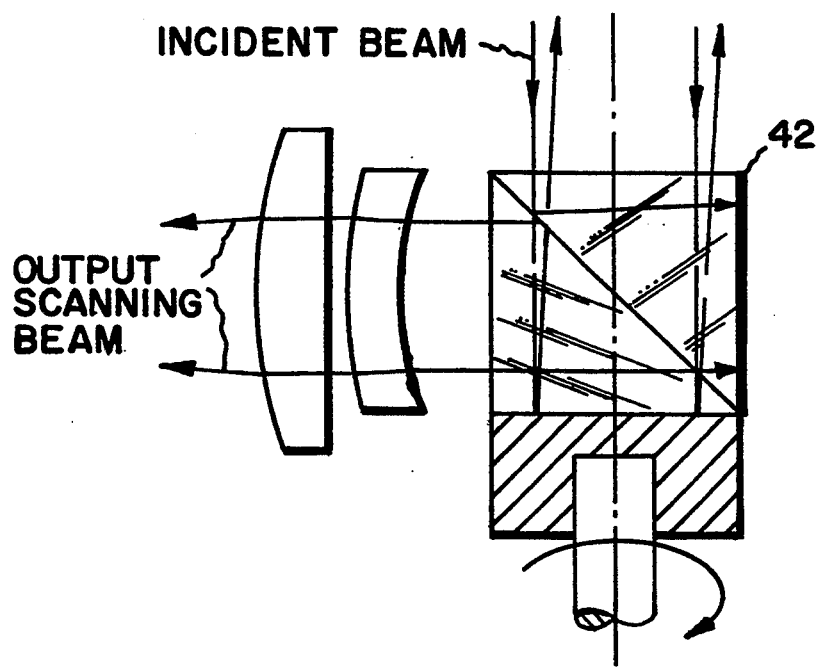
FIG. 5 is a front view illustrating a DRUM reflector such as shown in FIG. 2 in a preobjective deflector system.
Figure 6:
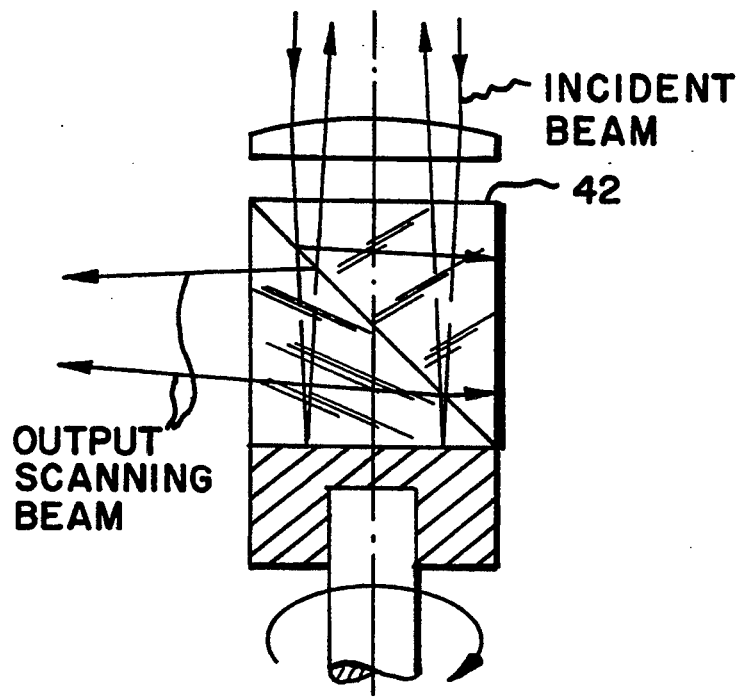
FIG. 6 is a front view showing a DRUM deflector such as shown in FIG. 2 in a postobjective deflector system.

Referring to FIG. 5, a DRUM cube beam deflector 42 is incorporated into a preobjective flat-field imaging system. A DRUM cube beam deflector 42 is shown incorporated into a postobjective internal drum imaging system in FIG. 6. Not shown in these FIGS. 5 & 6 is the system light source, which can be a single monochromatic laser source or a multi-wavelength source, the incident beam expansion and collimating optics, deflector spinner motor, and the flat image plane or the curved drum image plane, at which the output scanning beams are focused.

The deflector element 42 in FIG. 5 is depicted as being tilted, thereby not having the transmitted retroreflected beam parallel to the incident beam. The deflector element in FIG. 6 is also tilted to prevent the transmitted retroreflected and incident beams from being parallel, even though this is not depicted in the figure. Also, the deflector assembly 56 of FIG. 4 can be utilized in the postobjective internal drum system in FIG. 5 and, thereby minimize ghost scan beam and laser intensity instability problems associated with retroreflected specular light from the drum image plane.

Figure 7:
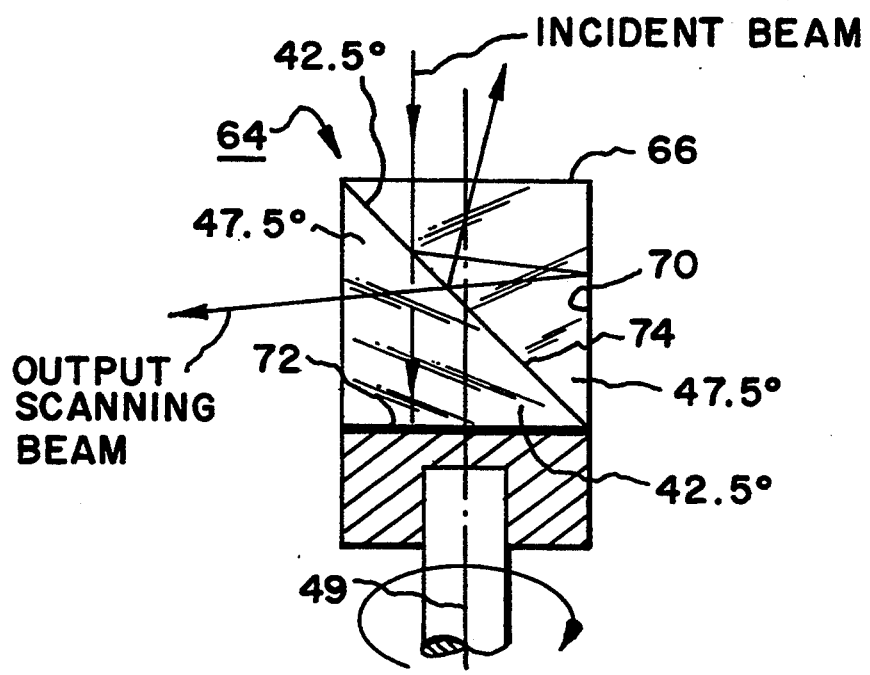
FIG. 7 is a front view illustrating a DRUM reflector in accordance with another embodiment of the invention wherein two right angle prisms having internal angles of 42.5° and 47.5° define the beam splitting reflector thereof.

Referring to FIG. 7, there is shown a DRUM rectangular beam deflector 64 having two essentially identical right angle prisms having included angles of 42.5 and 47.5 degrees, and the back surface 70 of the deflector element is used as the high reflecting mirror surface while the bottom deflector element surface 72 is the light absorbing, black painted surface. While the deflector element 64 is not cubic in shape, it is rotationally mass symmetric with regard to the deflector rotation axis 49 because the deflector element is centered on the rotation axis.

The inclusion angle between the beam splitter reflector 74 and mirror reflecting surface of the deflector 64 assembly is not 45 degrees, therefore the output scanning beam is not perpendicular to the deflector rotation axis 49 when the incident beam is parallel to the rotation axis 49. This non-perpendicular output scanning beam condition is well-suited for internal drum imaging systems. The configuration of FIG. 7 may be more economical for achieving the non-perpendicular scan beam condition than the deflector configuration in FIG. 4.

The scan beam tracking properties of the deflector 64 are identical to that achieved with the DRUM cube beam deflectors in FIGS. 2–6, and therefore, the back deflector element surface in these DRUM cube deflector assemblies can serve as the mirror reflecting surface while the bottom deflector element serves as the black painted surface. One potential advantage of having the black painted surface be on the bottom of the deflector element is that any nonflatness and/or stress induced in this surface by cementing the element to the mounting hub assembly would have no effect on the optical wavefront quality of the scanning beam. The disadvantage of having the back deflector element surface be the mirror reflecting surface is that this surface experiences centrifugal-force-induced flatness distortion while the bottom deflector element surface is virtually invariant to this type of distortion.

Figure 8:
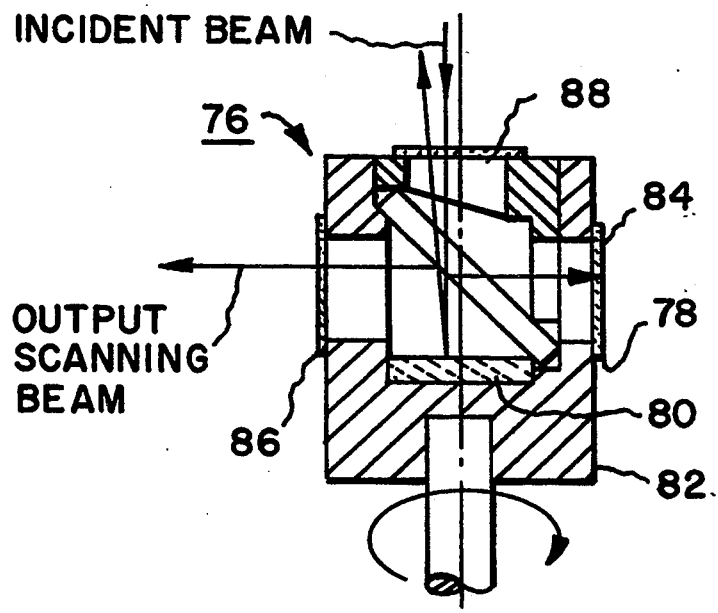
FIG. 8 is a front view of a dual reflection scanner composed of separate beam splitter and mirror elements.

FIG. 8 shows a DRUM beam deflector assembly 76 that is composed of separate beam splitter 78 and mirror 80 elements as opposed to being comprised of prism elements. While the scan imaging properties of this deflector assembly 76 are essentially identical to those of the DRUM cube beam deflectors in FIGS. 2–6, this deflector 76 is not as rotationally mass symmetric as those deflectors 42, 50, 56 and 64, and the beam splitter reflector surface 78 in this deflector is more sensitive with regard to centrifugal-force-induced flatness distortion than the beam splitter surfaces in the DRUM cube beam deflectors 42, 50, 56 and 64.

The deflector 76 may be lighter than DRUM cube beam deflectors employing glass prism deflector elements because the deflector housing 82 of this deflector 76 can be made of a plastic material instead of metal. A plastic deflector housing structure may be lower in manufacturing cost than that achieved for the DRUM glass prism deflectors. The deflector 76 configuration has a more aerodynamic form than the previously described DRUM cube deflectors, in that the housing 82 is cylindrically shaped, incorporating windows 84 and 86 to cover the opening ports in the deflector housing 82.

A flat input window 88, does not alter the optical imaging properties of the deflector assembly 76. When a cylindrically shaped deflector housing 82 is used, the output window 86 has a cylindrical profile conforming to the deflector housing. Therefore, this output window functions as a negative meniscus cylinder lens with a concentric center of curvature for its two surfaces. The cylindrical focusing power of this output window introduces astigmatism into the output scanning beam wavefront.

The magnitude of the cylindrical focal length, of the output window is given by:

$$f_w \simeq -\frac{n(r^2 + r)}{(n-1)t}, \tag{3}$$

where n is the index of refraction of the window material, t is the thickness of the window and r is the radius of curvature of the window which is the same as the radius of curvature for the deflector housing outer surface. In deriving Equation (3) it was assumed that $r \gg t$ and that air is the medium on both sides of the window. It is apparent from Equation (3) that the output window should be as thin as possible, thereby reducing the amount of astigmatism it produces in the output scanning beam.

The focal power of the cylindrical window 86 can add directly to the focal power of the system scan lens. The combined focal power for these lens elements can be expressed in terms of the focal length, $f_c$, where:

$$f_c = \frac{f_s f_w}{f_s + f_w}, \quad (4)$$

and $f_s$ is either the F-Theta scan lens focal length for a flat-field imaging system or the image drum radius for an internal drum imaging system. The scan beam astigmatism for the cylindrical window case is equal to the difference in focal length, $\Delta f$, between $f_c$ and $f_s$, which is given by:

$$\Delta f = \frac{-f_s^2}{f_s + f_w}. \quad (5)$$

It is evident from Equations (3) and (5) that the scan beam astigmatism is strongly dependent on both output window thickness and the system scan focal length $f_s$. An acceptable value for the scan beam astigmatism is that $\Delta f < 5$ mm for low to medium resolution imaging systems (<600 dots/inch), that $\Delta f < 2$ mm for medium to high resolution systems (<1200 dots/inch) and that $\Delta f < 1$ mm for high to very high resolution imaging systems. Based on these criteria, one can determine for a given image resolution requirement what the maximum value of $f_s$ can be as a function of $f_w$:

$$f_s \approx \sqrt{-f_w \Delta f} \quad (6)$$

In deriving Equation (6) from Equation (5) it is assumed that $f_w >> \Delta f$.

As an example of the astigmatism introduced into the output scanning beam by a cylindrically shaped output window, consider the case where the window parameters are $n = 1.52$, $t = 1$ mm and $r = 24$ mm, resulting in $f_w \approx -2000$ mm. This thickness window has too much cylindrical power except for low to medium resolution systems having a scan focal length $f_s \leq 100$ mm. Reducing the window thickness to 0.2 mm increases $f_w$ to about 10 meters, which enables the window to be used for medium to high resolution systems having $f_s \leq 140$ mm. Further reducing window thickness to 25 um increases $f_w$ to about 80 meters, which reduces wavefront astigmatism to acceptable values for high to very high resolution imaging systems having $f_s \leq 280$ mm.

It may be advantageous in a number of imaging applications to sacrifice some deflector aerodynamic form shape to achieve better scan beam wavefront quality. This trade-off between aerodynamic and optical properties is accomplished by replacing the cylindrical curved window with a spherical lens or flat window element shown in Chapter 5, "Holographic Deflector for Graphic Arts Systems" in the text, "Optical Scanning", Ed. By G. F. Marshall, and published by Marcel Decker, Inc., New York (1991), for monofacet nondisc hologon deflectors. Also, the cylindrical focusing power associated with a curved window can be compensated for by adding a positive cylinder lens element to the deflector assembly (See Teach et al. U.S. Pat. No. 4,662,707 of May 5, 1987) or by incorporating positive cylindrical focusing power into one of the optical surfaces of the deflector assembly. Incorporation of positive cylindrical power into the curved window element will be described hereinafter.

Microscope slide cover glasses range in thickness between 0.17 and 0.2 mm, are relatively parallel and are of relatively good optical quality and, therefore, may be used as windows 84, 86 and 88 in the deflector assembly 76 or other deflector assemblies incorporating flat and cylindrically shaped windows. These cover glass windows can be anti-reflection coated to both reduce their reflection losses and reduce ghost scan beams associated with specular retroreflected light from these window surfaces.

To conform to the radius of curvature of the deflector housing without breaking, the output windows can be molded to the required deflector housing radius by heating the window to the glass slump temperature and letting it conform to a mold having the desired radius. Corning Glass manufactures sheet glass in thicknesses of less than 0.1 mm that may be directly bent to conform to anticipated deflector housing sizes without breaking. Also, 25 um thick heat shrinkage clear plastic films may be used for the output and counter-balancing windows in the deflector assemblies. This plastic film material is not only advantageous with regard to its lack of influence on output scanning beam wavefront quality but also because it enables the film to closely conform to the cylindrically shaped deflector housing to provide a very light and aerodynamically smooth surface. Wrinkles in the plastic film can be removed from port opening areas after the film is attached to the deflector housing by directing a stream of warm air at the film, thereby producing acceptable optical windows.

Figure 9:
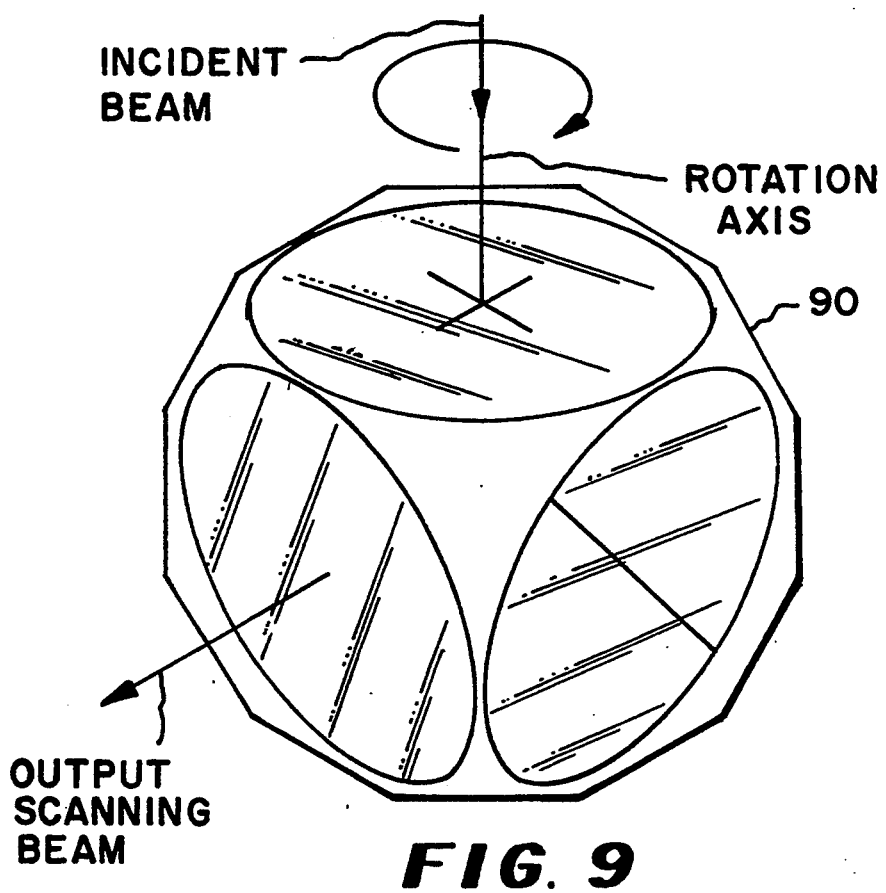
FIG. 9 is a perspective view showing a dual reflection cube beam reflector with corners removed for weight reduction.

FIG. 9 shows a DRUM cube beam deflector element 90 that has its corners and edges bevelled so that the cube surfaces more closely conform to a circular aperture profile, thereby removing unrequired material from the deflector element while improving its aerodynamic form.

Figure 10:
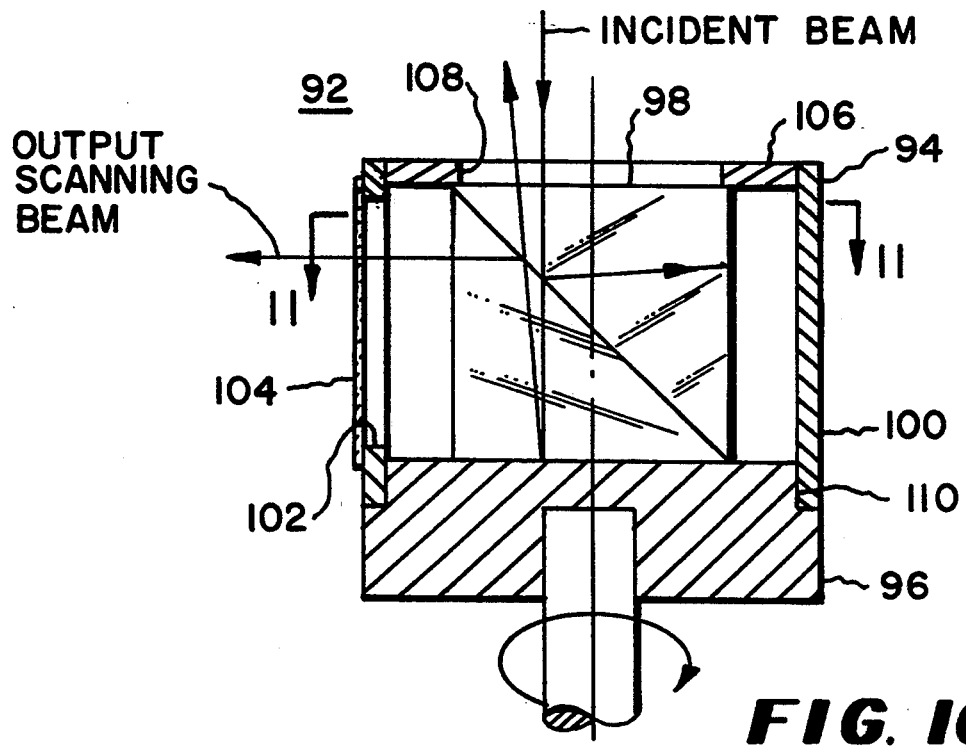
FIG. 10 is a front sectional view similar to FIG. 2 wherein the DRUM deflector cube is in a cylindrical housing.
Figure 11:
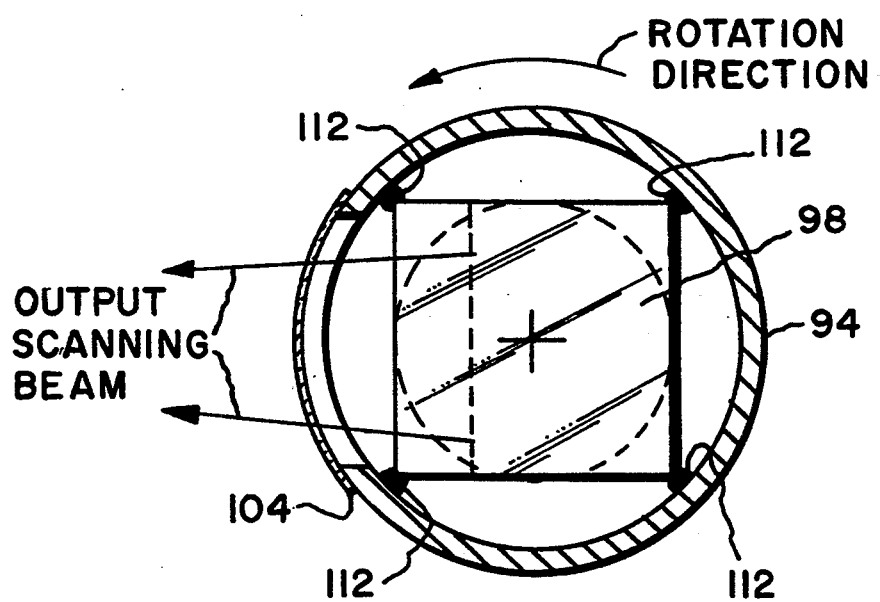
FIG. 11 is a sectional top view of the deflector shown in FIG. 10 taken along the line 11—11 in FIG. 10.

FIGS. 10 and 11 show a DRUM cube beam deflector assembly 92 that incorporates a cylindrically shaped housing 94 and mounting hub 96 arrangement to enclose the cube deflector element 98 and thereby significantly reduces scan beam positioning error associated with deflector induced air turbulence in the scan beam path. The deflector element enclosure housing 94 has a cylinder side wall 100 having an opening 102 through which the output scanning beam passes, an output window 104 to aerodynamically seal the side wall opening, and a top plate 106 having an opening through which the incident beam passes. The top plate 106 of the deflector enclosure housing 94 contacts the top surface of the cube deflector element and seals the entrance aperture 108 at its circumference. The cylinder side wall 100 of the deflector enclosure housing fits into a reduced diameter step 110 portion of the mounting hub assembly and thereby completes the sealing of the cube deflector element within the enclosure housing 94.

The output window 104 can either be a thin glass plate or a thin plastic film that conforms to the cylinder side wall exterior radius, as discussed in connection with FIG. 8. Attachment of the enclosure housing to the mounting hub assembly can be accomplished by means of screws, tape or cement. As depicted in FIG. 11, potting compound 112 can be utilized to help secure the deflector element within the enclosure housing.

This potting compound is depicted as being used in only the corner regions of the cube because this arrangement minimizes the amount (mass) of potting compound used while essentially maintaining the rotational symmetry of the deflector assembly with regard to the deflector rotation axis. It can fill the housing except in the sector near the output window.

The enclosure housing 94 may be either machined or molded as a single part that is slipped down over the prism deflector element and mated with the mounting hub 96. Also, this one piece enclosure housing may have a wall thickness that is approximately a third of that depicted in FIG. 11 to reduce any imbalance associated with the enclosure side wall opening 102 and thereby improve the high speed rotation performance of the deflector assembly.

FIGS. 12 and 13 show a DRUM cube deflector assembly that incorporates an enclosure housing 120 that is rotationally mass symmetric with respect to the deflector rotation axis 122. This mass symmetry is achieved by including a second opening port 124 with cover window 126 in the enclosure side wall. This second opening port with window is essentially identical to the output scanning beam port 128 and window 130 and is positioned opposite to them, thereby counterbalancing any lack of mass associated with the output window 130 and port 128.

The cube deflector element in FIGS. 12 and 13 is comprised of two 45 degree right angle prism elements 134 and 136 which are essentially identical except for the material used to fabricate the prism elements. The prism element 134 has an index of refraction $N_1$, while prism element 136 has an index of refraction $N_2$, and $N_1 > N_2$.

Except for the difference in index between prism elements 134 and 136, all other fabrication details of the cube deflector element in FIGS. 12 and 13 are the same as those described for the cube deflector element in FIG. 2. The incident beam is parallel to the deflector rotation axis 122 before entering the top surface of the cube deflector element 132. After entering the deflector the incident beam propagates to the partially reflecting surface 138 which equally divides the incident beam into reflected and transmitted beams. The reflected beam propagates to the back, black painted surface 140 of the deflector element and is virtually totally absorbed. When the transmitted beam propagates from the $N_1$ prism element 134 into the $N_2$ prism element 136, the beam is bent so that it propagates at a slightly larger angle with respect to the normal to the beam splitter surface 138. This slight increase in beam propagation angle causes the transmitted beam to be at a slight angle with respect to both the deflector rotation axis 122 and the bottom mirror reflecting surface 140 of the deflector element 132 which is perpendicular to the rotation axis. The retroreflected beam from the bottom mirror reflecting surface is likewise at an angle with regard to the deflector rotation. The output scanning beam is therefore not perpendicular to the deflector rotation axis. The transmitted, retroreflected beam is further deviated from being parallel to the rotation axis as it propagates from the $N_2$ to the $N_1$ prism and then exits the deflector element 132. This dual refractive index DRUM cube beam deflector assembly achieves the non-perpendicular scanning beam condition of FIG. 4 and the non-parallel transmitted retroreflected beam condition of FIGS. 3 and 4 without the need for additional glass or metal wedge members.

The prism element materials can be selected so that the DRUM cube beam deflector element 132 possesses both a dual refractive index property and rotational mass symmetry with regard to the deflector rotation axis. The following two examples are based on data obtained from the Schott Glass Catalog and show that materials can be selected for the $N_1$ and $N_2$ prisms that have relatively large differences in refractive indices while having essentially equal densities: BaLF4 and SFL14 both have a density of approximately 3.17 g/cm$^3$ while their respective indices of refraction are 1.577 and 1.754 for $\lambda = 0.6328$ um; SK13 and SFL6 both have a density of approximately 3.37 g/cm$^3$ while their respective indices of refraction are 1.589 and 1.799 for $\lambda = 0.6328$ um.

The cube beam deflector element 132 is depicted as being attached to a mounting plate 142 that is attached to the top of the mounting hub assembly by two screws 144. This mounting plate mechanical attachment may be preferred over directly attaching the deflector element to the mounting hub assembly with cement, especially since this mounting plate arrangement permits adjustments in positioning of the deflector element 132 on the mounting hub/motor assembly 150 which facilitates the dynamic balancing of the total deflector assembly.

The mounting plate 142 may reduce the nonflatness and/or stress induced in the bottom deflector element surface 140 that is associated with cementing the deflector to the mounting hub assembly. The mounting plate 144 may be plastic, but can also be fabricated in metal, glass and ceramic materials.

Figure 14:
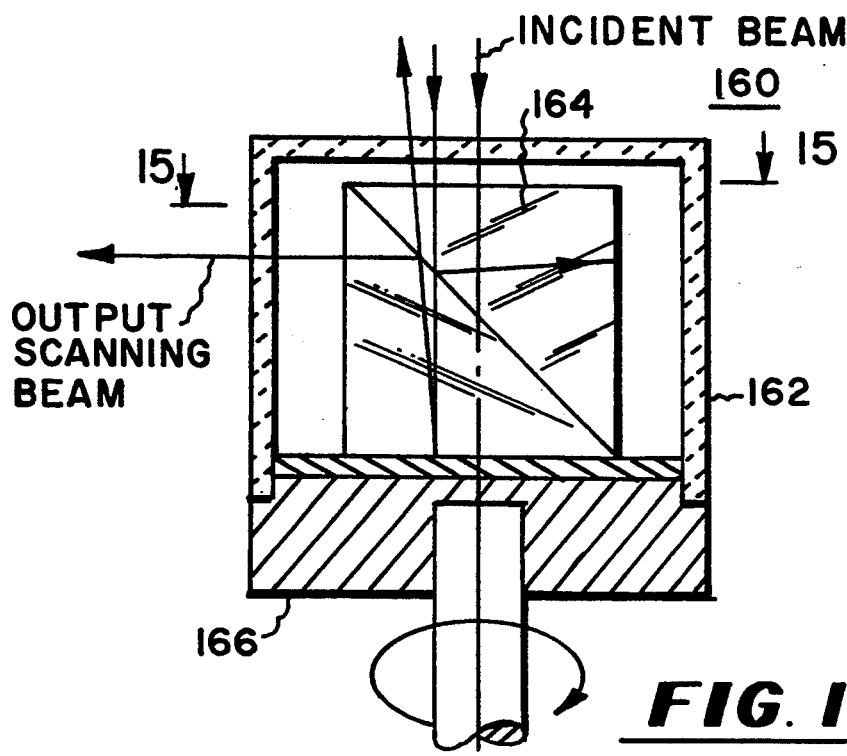
FIG. 14 is a sectional elevational view of a DRUM reflector such as shown in FIG. 2 in a transparent cylindrical housing.
Figure 15:
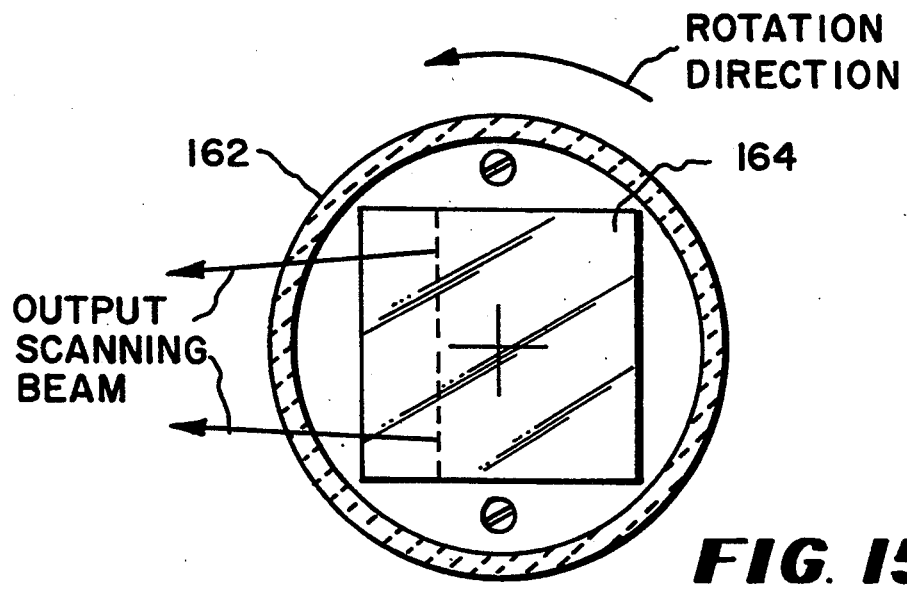
FIG. 15 is a sectional view of the deflector shown in FIG. 14 taken along the line 15—15 in FIG. 14.

FIGS. 14 and 15 show a DRUM cube deflector assembly 160 that incorporates a totally transparent cylindrical windshield cap 162 that encloses the cube deflector element 164 on all sides except at the mounting hub assembly 166. Because this transparent cap requires no beam openings (ports), it is totally rotationally mass symmetric with regard to the deflector rotation axis. The transparent enclosure windshield or housing 162 may be precision molded in optical quality plastic, thereby enabling this enclosure to be utilized in high resolution imaging applications.

The transparent cylindrical windshield housing 162 may correct for the astigmatism introduced into the output scanning beam wavefront by the negative cylindrical focusing power associated with a cylindrically curved output window, as calculated by Equation (3). This can be accomplished by designing the transparent enclosure 162 so that, in the region of the enclosure that serves as the output window aperture, the center of curvature of the outer enclosure surface is centered on the deflector rotation axis while the center of curvature of the inner enclosure surface is located at a different point. This inner center of curvature may be located on the line that bisects the center of the output window aperture and the deflector rotation axis at a point which is greater than the distance along that line to the deflector rotation axis. As the center of curvature for the inner enclosure surface increases in distance from the rotation axis position, the cylindrical focusing power of the output window progressively decreases from negative values toward zero and then progressively increases toward larger positive values.

By positioning of the center of curvature for the inner enclosure surface, one may correct, not only for the cylindrical focusing power associated with curved output windows, but also for the cylindrical power generated in deflector elements by centrifugal-force-induced deflector element surface distortion. This type of surface distortion occurs in the front output surface of a DRUM cube deflector element and causes this surface to become a negative cylindrical lens. This type of surface distortion occurs in the back mirror reflector surface of the deflector assembly shown in FIG. 7 and causes that surface to become a convex cylindrical mirror. The transparent cylindrical enclosure housing 162 may be shaped to correct for the nonsymmetrical centrifugal-force-induced surface flatness distortion in the beam splitter reflector in a DRUM deflector assembly, especially at very high speeds of rotation.

Figure 16:
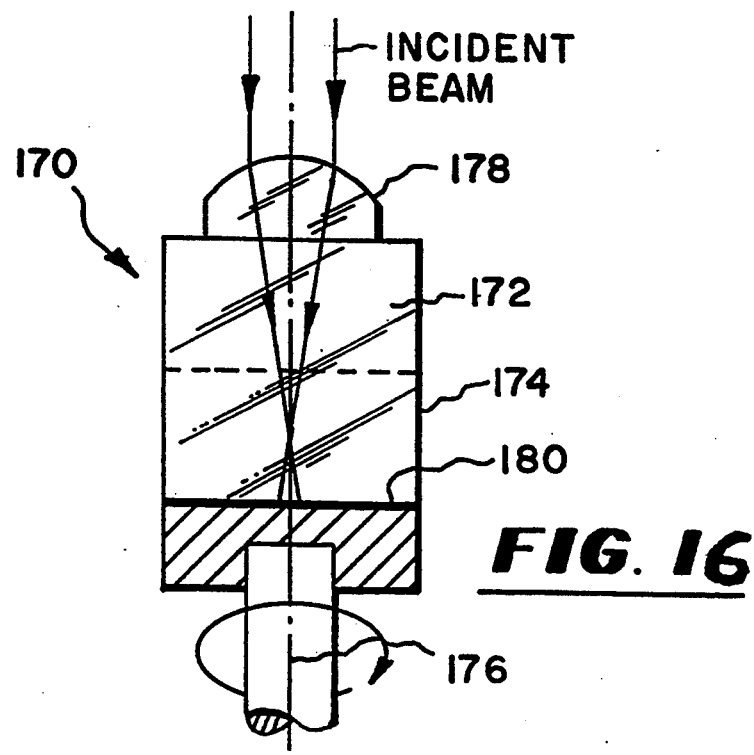
FIGS. 16 and 17 are, respectively, sagital sectional and tangential sectional side views of a DRUM deflector having a cylindrical postobjective lens.
Figure 17:
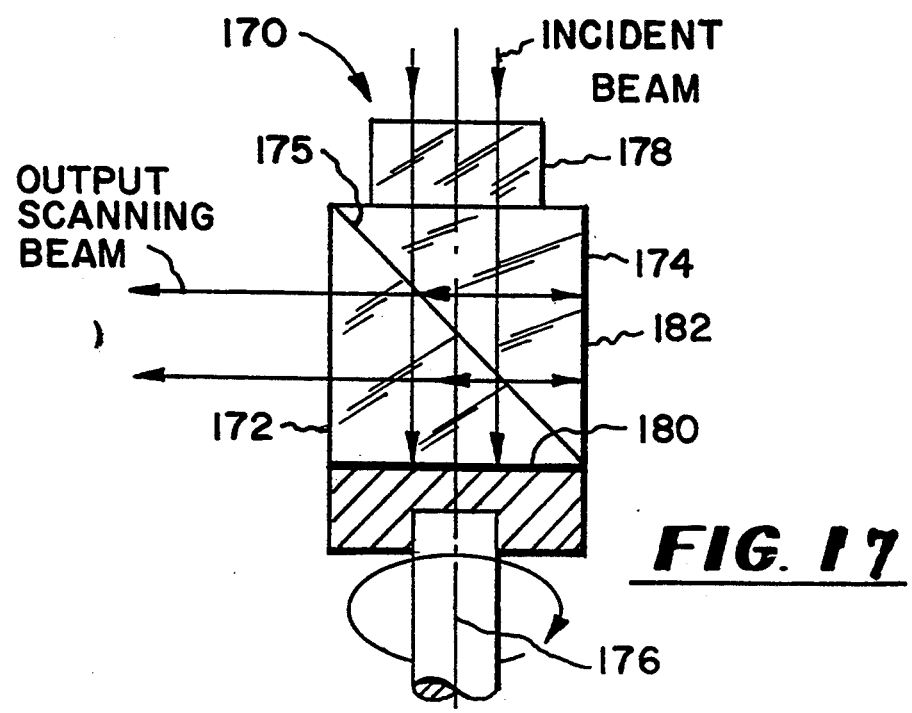

Referring to FIGS. 16 and 17, there is shown a cylindrically shaped DRUM beam deflector assembly 170 that is comprised of two essentially identical cylindrically shaped 45 degree right angle prisms 172 and 174, which form an aerodynamically smooth prism based DRUM beam deflector assembly without utilizing a separate deflector enclosure structure. In this deflector, a collimated incident beam is collinear with the deflector rotation axis 176. In the sagittal (in-scan) plane this beam is focused by a positive cylinder lens 178 that is optically cemented to the top surface of the deflector element. This cylinder lens focuses the beam to a first image point which is located a short distance from the bottom black absorbing surface 180 of the deflector element and to a second image point that is also located a corresponding short distance in front of the back cylindrical mirror reflecting surface 182 of the deflector element. The position of the second image point is chosen so that the retroreflected beam from the concave cylindrical mirror reflecting surface 182 appears to diverge from a virtual point image located at the position of the focal point associated with the cylindrical lens output surface of the deflector element. For these deflector system imaging parameters, the output scanning beam in the sagittal plane is collimated, as shown in the top view of this deflector assembly 170 in FIG. 18.

Figure 18:
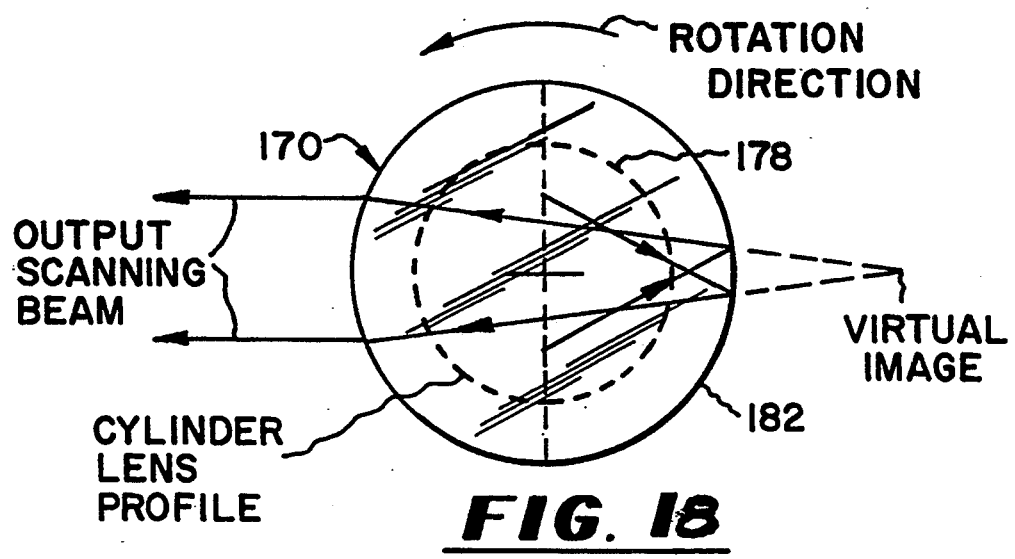
FIG. 18 is a sectional top view of a cylindrical DRUM deflector in accordance with another embodiment of the invention.

The collimated incident beam in the tangential (cross-scan) plane in the deflector assembly shown in FIGS. 16 and 17 is unaffected by the cylinder lens and propagates as a collimated beam to the beam splitter reflector surface 175 which equally divides this beam into reflected and transmitted beams. The transmitted beam is virtually totally absorbed by the bottom black absorbing surface 180 of the deflector element while the reflected beam propagates to the back mirror reflecting surface 182 of the deflector element. In the tangential plane, this mirror reflecting surface appears as a flat reflector and, therefore, the retroreflected tangential beam profile from the mirror surface is collimated. Approximately half of this retroreflected collimated beam propagates to the front output surface of the deflector element which also appears as a plane surface in the tangential plane and, therefore, the output scanning beam in this plane is also collimated. A collimated incident beam emerges in both planes from this cylindrically shaped deflector as a collimated beam. As shown in FIG. 18, this deflector assembly is rotationally mass symmetric with respect to the deflector rotation axis, it has good aerodynamic form, and the mirror reflecting surface and the deflector output surface are virtually invariant with regard to centrifugal-force-induced surface distortion due to their cylindrical shape.

Figure 19:
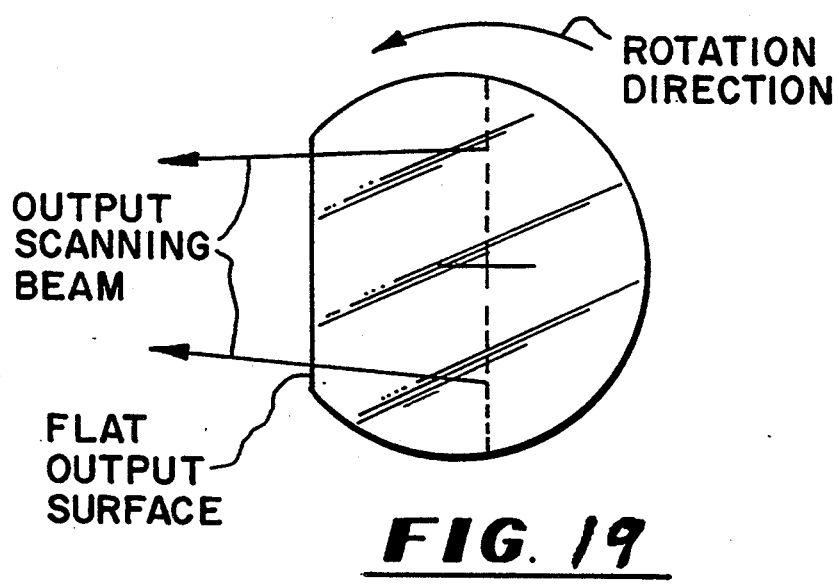
FIG. 19 is a sectional top view of a semicylindrical DRUM deflector in accordance with another embodiment of the invention.

FIG. 19 shows a semi-cylindrically shaped DRUM beam deflector assembly. FIG. 19 is exemplary of the variations in shape that a prism based DRUM beam deflector assembly can assume. All the optical surfaces that contribute to the output scanning beam in the FIG. 19 deflector assembly are flat and, therefore, an incident collimated beam will emerge as a collimated scanning beam without the need for additional lens elements.

Figure 20:
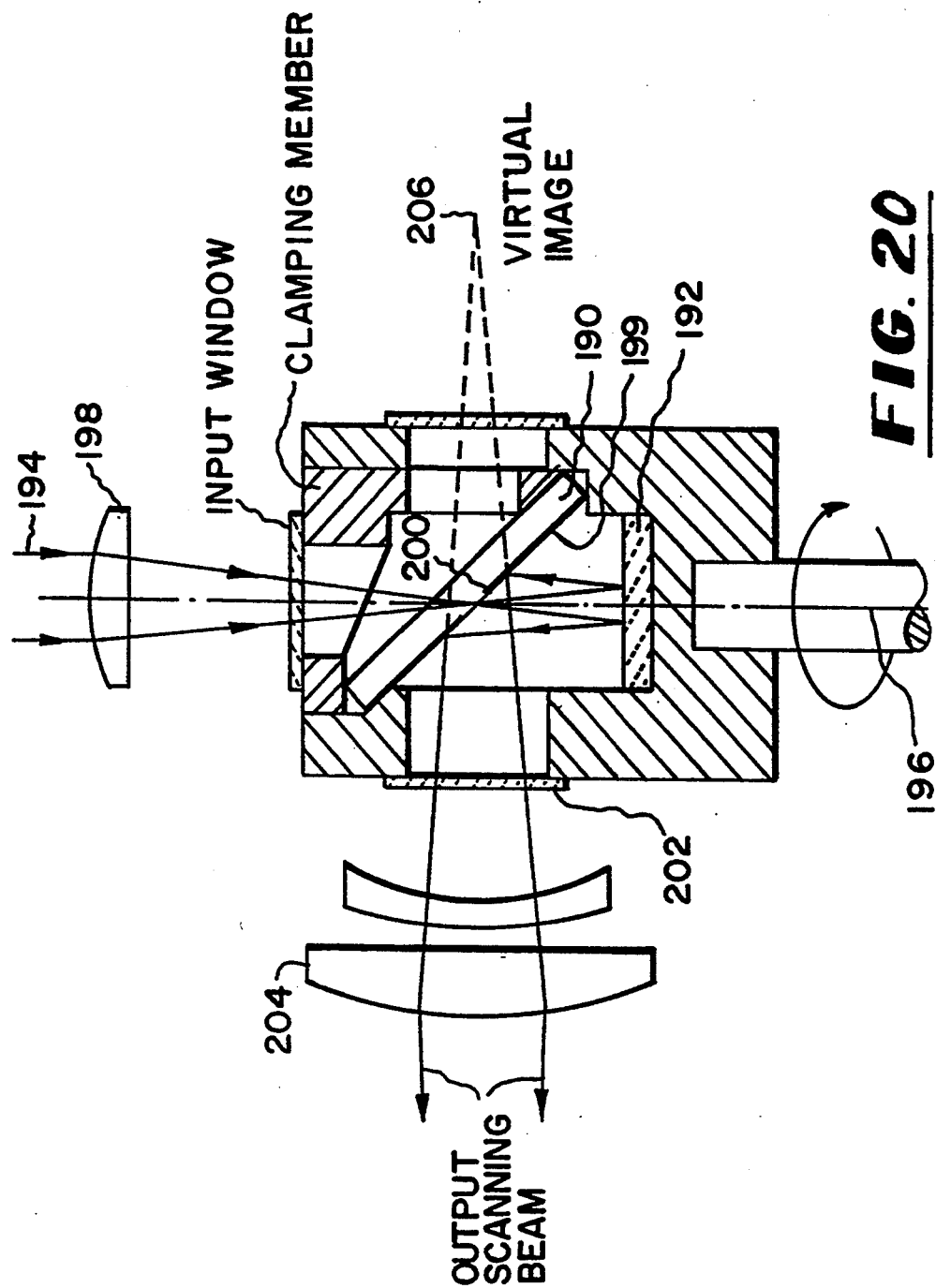
FIG. 20 is a sectional front view of a DRUM reflector that incorporates a spatial beam splitter and a mirror to make the scan beam insensitive to deflector wobble.

FIG. 20 shows a DRUM beam deflector assembly that is composed of separate spatial beam splitter 190 and mirror 192 elements, similar to the FIG. 8 deflector assembly. This deflector assembly differs from the FIG. 8 deflector assembly, and all the other previously described DRUM beam deflector assemblies, by employing a spatial beam splitter 190 instead of the partially reflecting beam amplitude splitter surfaces utilized in the previously described DRUM beam deflector assemblies.

The incident beam 194 is collinear with the deflector rotation axis 196 and strikes a spherical lens 198 centered on the rotation axis prior to the deflector assembly. This lens focuses the incident beam to an image point on the deflector rotation axis that is located near the reflecting surface 199 of the spatial beam splitter element 190. The spatial beam splitter reflector element consists of the high reflecting mirror surface 199 that has a small hole 200 in its center. This hole is located on the deflector rotation axis, thereby enabling virtually 100% (one hundred percent) of the focused incident beam to pass through the hole. The transmitted beam from the beam splitter mirror expands rapidly in size as it propagates toward the flat mirror 192 located at the bottom of the enclosed deflector cavity.

The retroreflected beam from the bottom mirror element 192 continues to expand in size as it propagates back to the beam splitter mirror 199. When the retroreflected beam reaches the splitter mirror, its size is substantially larger than the small central hole 200 in the splitter mirror surface and, therefore, essentially all of the retroreflected beam energy is redirected by this splitter mirror in the direction of the output scanning beam. After passing through the deflector output window 202, the output scanning beam is incident on an F-Theta scan lens 204 that is designed to focus the diverging scan beam to a flat-field image plane. This diverging scan beam appears to originate from a curved object plane, centered on the deflector rotation axis 196 and located at the indicated virtual image point 206.

The inclusion angle between the spatial beam splitter mirror 199 and bottom mirror element 192 is 45 degrees, as indicated by the scan beam being perpendicular to the deflector rotation axis. Scan beam tracking performance for this deflector assembly is the same as that achieved with the DRUM beam deflector assemblies incorporating beam amplitude splitter surfaces. The major advantage of this deflector assembly is that it can achieve virtually 100 percent radiometric throughput efficiency while still being essentially insensitive to changes in the incident beam polarization state, wavefront divergence, incidence angle and operating wavelength. This deflector configuration is very close to being rotationally mass symmetric and has an aerodynamically smooth profile when the deflector housing is cylindrically shaped. The beam splitter 190 mirror optical coating may be a broad spectral bandwidth metal or metal dielectric hybrid film for most imaging applications. Such mirror coatings are less sensitive to changes in the beam polarization state, wavefront divergence and operating wavelength than ordinary multi-layer dielectric mirrors. The central hole in the splitter mirror can be made by placing a small removable blocking mask on the mirror substrate prior to depositing the mirror reflective coating. This central hole can also be generated in the mirror coating after this coating has been deposited on the mirror substrate by photoresist etching techniques. It may be advisable in very high power laser applications and/or U.V. laser imaging applications to physically generate a small central hole through both the mirror coating and the mirror substrate, thereby avoiding the potential danger associated with the laser energy blackening (solarization) and/or shattering the mirror substrate.

Figure 21:
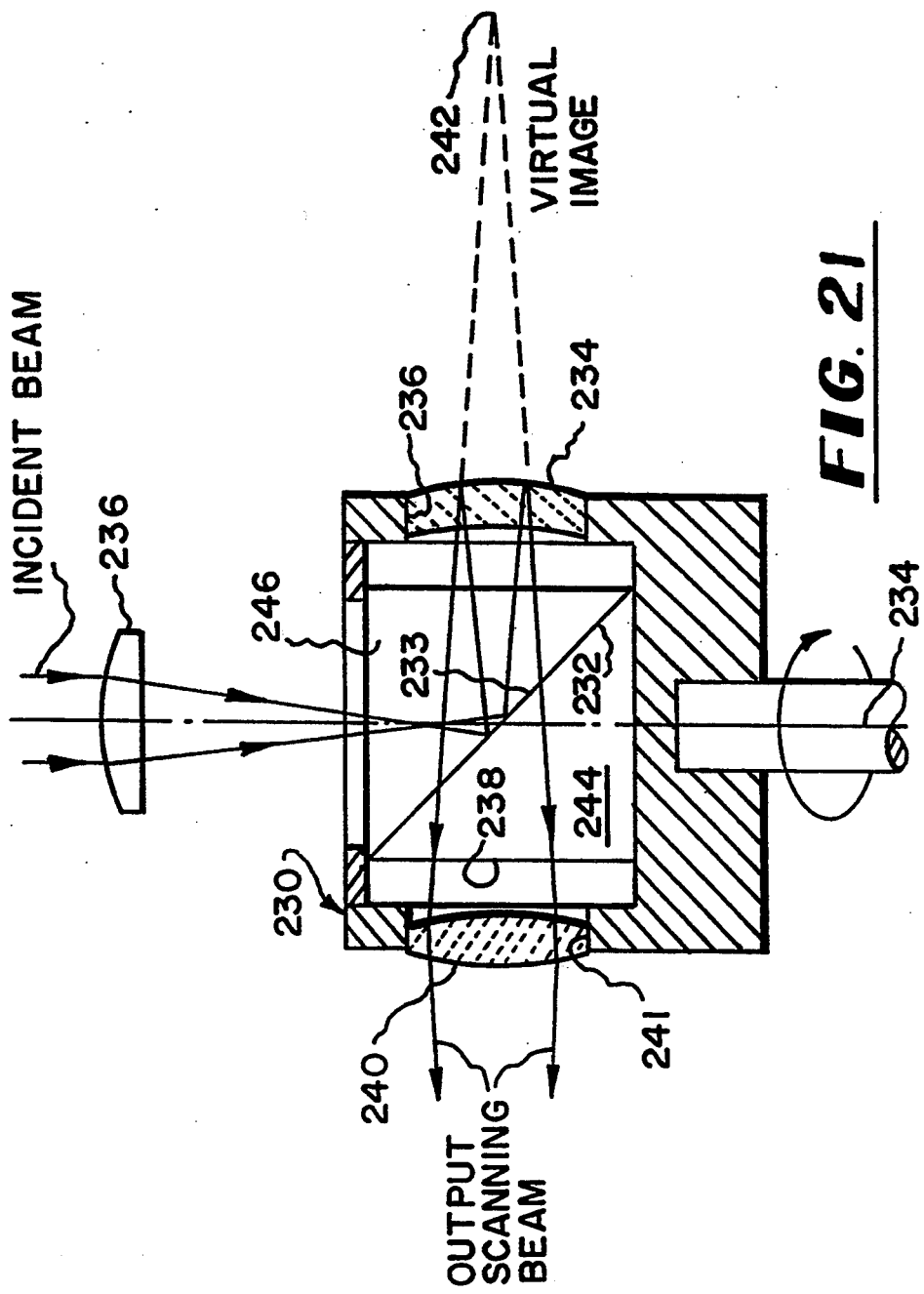
FIG. 21 is a sectional front view of a DRUM deflector which is adapted for use in an internal DRUM configuration and which incorporates a spatial beam splitter and a spherical mirror to make the scan beam insensitive to deflector wobble.

FIG. 21 shows a DRUM cube beam deflector assembly 230 that incorporates a spatial beam splitter surface 232 to achieve virtually 100 percent radiometric throughput efficiency. The incident beam in this deflector configuration is collinear with the deflector rotation axis 234 and strikes a spherical lens 236 centered on the rotation axis prior to the deflector assembly 230. This lens focuses the incident beam to an image point on the deflector rotation axis that is located just before the beam splitter reflecting surface 232 in the cube deflector element. The spatial beam splitter surface in this deflector assembly consists of a transparent surface having a small mirror reflector 233 located at its center. This small mirror reflector 233 is located on the deflector rotation axis, thereby enabling virtually 100 percent of the focused incident beam to be reflected in a direction that is perpendicular to deflector rotation axis. This reflected beam from the beam splitter mirror expands rapidly in size as it propagates toward and through the back deflector element surface and is incident on a thick, second surface concave spherical mirror 234 having the form of a Mangin mirror. This Mangin mirror is located in a throughput opening 236 in the side wall of the cylindrically shaped deflector housing and is angularly orientated so that the central incident ray is retroreflected in a direction perpendicular to the deflector rotation axis.

The retroreflected beam from the Mangin mirror 234 continues to expand in size as it propagates back to the beam splitter surface. When the retroreflected beam reaches the splitter surface its size is substantially larger than the small central mirror reflector on the transparent splitter surface and, therefore, essentially all of the retroreflected beam energy is transmitted through the splitter surface 232. After passing through the cube deflector element output surface 238, the retroreflected transmitted beam is incident on a single spherical focusing lens 240 that is located in a throughput opening 242 in the side wall of the cylindrically shaped deflector housing. This focusing lens images the output scanning beam to a point located on an internal drum imaging surface (not shown).

The optical imaging properties of the Mangin mirror 234 are chosen to image the focused incident beam to a virtual image 242 located approximately two deflector assembly diameters behind the Mangin mirror. Because both the Mangin mirror and the focusing lens rotate with the deflector unit, they are only used on their optical axes and, therefore, wavefront quality of the output scanning beam is only determined by the combined spherical aberration of these optical elements. It is desirable to design the Mangin mirror 234 and focusing lens 240 parameters so that spherical aberrations associated with these components are essentially equal and of opposite signs.

The central small mirror reflector 233 on the beam splitter surface 232 carl be produced by depositing the reflective coating through a contact mask onto one of the prism element surfaces prior to cementing of the prisms 244 and 246. This small mirror reflector 233 can also be produced by depositing a reflective coating on the prism element surface and using photoresist etching methods to remove all but the desired reflecting film from this surface prior to cementing of the prism elements.

Figure 22:
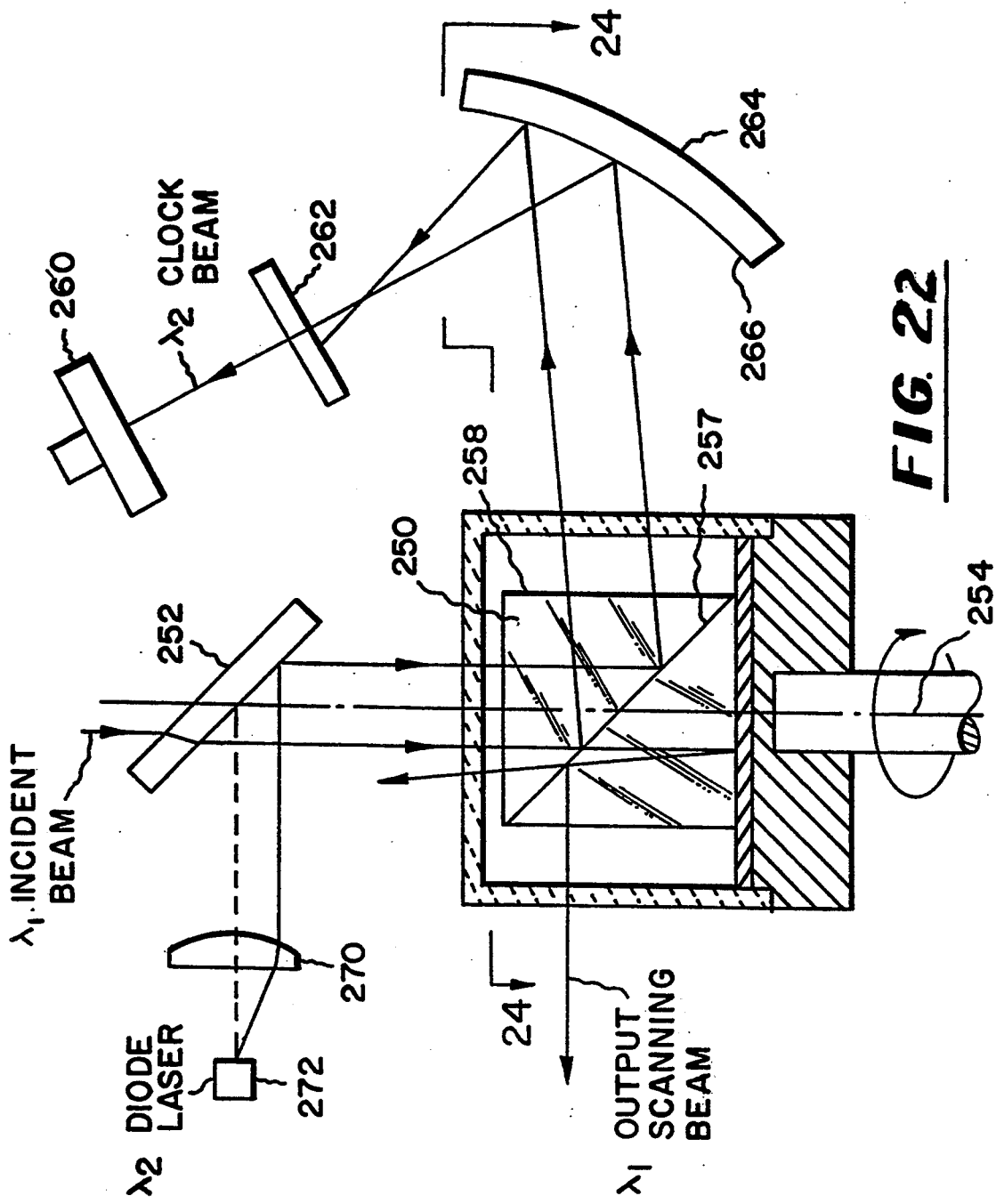
FIGS. 22 and 23 are schematic front and top views, the top view being taken along the line 24—24 in FIG. 23, of a deflector system which enables tracking of the scanning beam for in-scan beam motion control.
Figure 23:
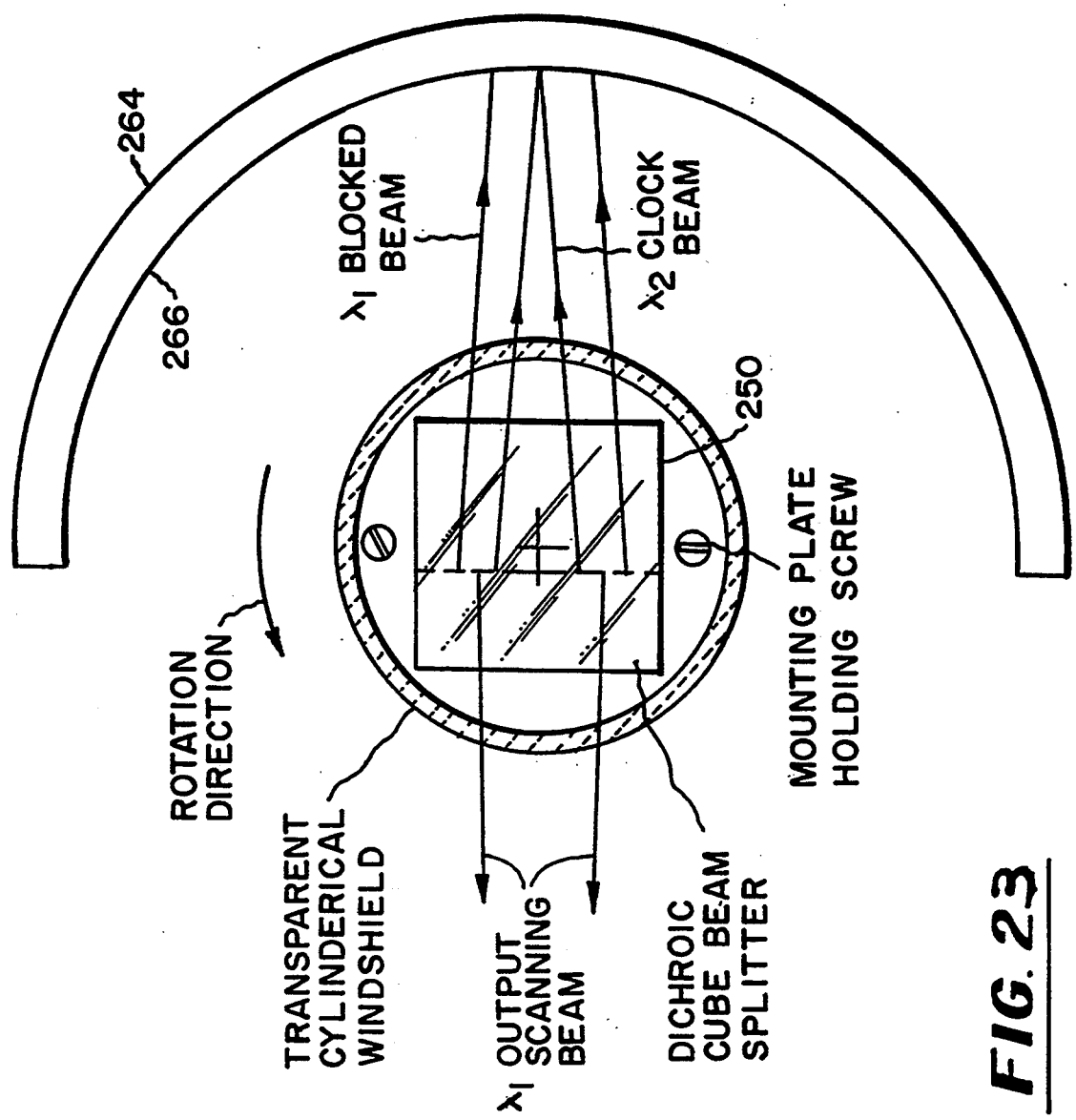

Referring to FIGS. 22 and 23, there is shown a DRUM deflector system that uses one laser wavelength, $\lambda_1$, to record images on an internal drum surface and a second laser wavelength, $\lambda_2$, to track the angular rotational position of the deflector element 250. This system corrects in-scan beam jitter error which is directly proportional to change in the in-scan component of deflector wobble.

While useful for compensating for motor hunting related in-scan beam positional error, the shaft encoder sensing of such error does not correct for in-scan jitter associated with changes in deflector element wobble angle and usually does not have sufficient resolution to correct for in-scan jitter associated with bearing and bearing raceway irregularities in ball bearing mounted deflector units. Some high resolution flat-field laser scanning systems use a pixel grating clock to dynamically measure the in-scan beam position at many points across the scan field (see U.S. Pat. No. 4,695,772 to Motooka of Sep. 22, 1987) and thereby correct for in-scan beam jitter error caused by motor hunting, changes in deflector element wobble, motor bearing irregularities and scan linearity error associated with the F-Theta scan lens. Incorporation of a pixel grating clock system into a flat-field image recording system is usually accomplished by using a second non-intensity modulated beam that is incident on the beam scanning facet at a slightly different in-scan angle than that of the image recording beam. The deflected unmodulated tracking beam propagates through the F-Theta scan lens at an in-scan angle relative to the recording beam and is blocked from striking the recording image plane by a flat mirror element that is usually positioned about 70 percent of the distance between the scan lens and the recording plane. The unmodulated tracking beam is redirected by the blocking mirror to a relatively low resolution (approximately 10 lines/mm) flat amplitude grating element located at the focal plane of the scan lens. After passing through the grating element, the position encoded tracking beam is directed to a photodetector. Signals from the photodetector are used to compensate the recording scan beam pixel clock rate for in-scan beam positional errors.

Incorporation of a pixel grating clock system into an imaging system increases the complexity and cost of the system and also requires locating additional optical components in the vicinity of the image recording plane. This last requirement normally prohibits the use of a pixel grating clock system in internal drum imaging applications. Incorporation of a pixel grating clock system has been accomplished in galvanometer deflector systems by using a two-sided facet with the front side used to scan the recording beam while the unmodulated tracking beam is deflected from the back side of the facet.

The incident recording beam in FIG. 22 has a wavelength of $\lambda_1$. The unmodulated tracking clock beam has a wavelength, $\lambda_2$. $\lambda_1$ may reside within the range of 0.416 to 0.68 um for recording images on silver halide based photosensitive materials while $\lambda_2$ may be greater than 0.8 um to minimize the risk of exposing the imaging media by the tracking beam. Not shown in FIGS. 22 and 24 are the recording beam laser source, beam expanding and collimating optics, the predeflector focusing lens, nor the drum image recording surface.

The incident recording beam in FIG. 22 propagates parallel to the deflector rotation axis before and after propagating through a dichroic beam combiner 252. The incident tracking beam is reflected parallel to the rotation axis 254 by the dichroic beam combiner 252. For illustrative clarity reasons only, a single incident recording and tracking beam ray is presented in FIG. 22. These incident beams are both collinear to the deflector rotation axis 254 before entering the dichroic beam splitter cube deflector 250.

The dichroic beam splitter 257 and beam combiner 252 elements are optically coated to have different reflection and transmission properties for different incident wavelengths. The dichroic beam combiner 252 is coated so that it transmits virtually 100 percent of the incident $\lambda_1$ beam while reflecting virtually 100 percent of the $\lambda_2$ beam. The dichroic beam splitter surface 257 in the DRUM cube deflector element 250, is coated to reflect virtually 100 percent of the incident $\lambda_2$ beam while equally dividing the incident $\lambda_1$ beam into reflected and transmitted beams. This dichroic beam splitter surface 257 desirably has fairly small differences in performance for S and P polarizations for both incident beam wavelengths, though this requirement is less important with regard to the $\lambda_2$ beam.

The scan beam imaging properties of the DRUM deflector element 250 for the $\lambda_1$ beam are essential as previously described (see FIGS. 14 and 15), except the reflected beam from the splitter surface is not absorbed by a black painted surface. The back surface 258 of the cube deflector element 250 is optically coated to minimize the reflectivity of this surface for both the $\lambda_1$ and $\lambda_2$ beams. The back deflected $\lambda_1$ and $\lambda_2$ beams from the dichroic beam splitter surface 257 exit through the back side 258 of the deflector assembly and are scanned at the same angular rate that the output ($\lambda_1$) scanning beam experiences. Both the cross-scan and in-scan beam tracking performance for these back deflected beams are sensitive to changes in the deflector wobble angle.

The back deflected scanning beams are incident on a spherical concave mirror 264 which focuses these beams to a photodetector 260. A wavelength blocking filter 262 positioned before the photodetector 260 stops the $\lambda_1$ beam while virtually passing 100 percent of the $\lambda_2$ beam thereby improving the signal-to-noise ratio of the $\lambda_2$ clock beam. Attached to the front reflecting surface of the spherical concave mirror element 264 is a transparent film containing a relative low resolution (approximately 10 lines/mm) amplitude grating 266.

By adjustment of the spacing of $\lambda_2$ diode laser 272 collimating lens 270, the 80 2 back deflected beam can be focused on the front surface 266 of the spherical concave mirror 264, as depicted in FIG. 24. The center of curvature of the spherical mirror 264 is located on the deflector rotation axis 254. The $\lambda_2$ beam remains focused on the spherical mirror surface 266 as it scans along the mirror surface 266. Under these imaging conditions, the back deflected $\lambda_2$ beam is, after reflection from the spherical mirror 264, amplitude-modulated at a frequency that is directly proportional to the deflector element 250 rotation angle.

All of the reflected scan light from the spherical mirror can be detected by the photodetector 260 which is of a size which is only slightly larger than the diameter that the $\lambda_2$ beam has at the deflector beam splitter surface 257 when the photodetector is positioned at the point where the spherical mirror forms an image of that deflector surface. This conjugate imaging point is approximately located at a distance equal to the radius of curvature of the spherical mirror 264.

The back deflected $\lambda_2$ beam is focused on the surface of the spherical concave mirror and, therefore, this mirror can be replaced by a cylindrical concave mirror having the same radius of curvature as the spherical mirror without significantly altering the imaging properties of the $\lambda_2$ beam. One advantage of using a cylindrical mirror is that it is easier to attach the film grating element to a cylindrical surface than to a spherical surface. The film grating element may also be attached on a cylindrically shaped transparent window element that is positioned either before or after the concave mirror. This cylindrical window element may also serve as the wavelength blocking filter.

The wavelength blocking filter could also be readily placed on the back surface of the deflector element if it consists of 1 to 2 mil thick plastic film having a coloring agent dissolved within the film. Such types of color transparent films are commercially sold for photographic and special lighting applications and are available from Rosco of Port Chester, N. Y. This type of wavelength blocking filter arrangement could also be used in place of the black painted surface in the FIG. 2 deflector assembly.

While the flat planar type photodetector depicted in FIG. 22 is suitable for a grating clock system used for a flat-field imaging application, it is less suited for a grating clock system utilized for an internal drum imaging application because drum systems have much larger scan angles. Incidence landing angle of the $\lambda_2$ beam on a flat photodetector surface is equal to the system scan angle which approaches $\pm 90°$ for an internal drum system, as indicated by the spherical mirror profile in FIG. 23.

The photodetector used for an internal drum imaging application may have a cylindrically curved light detecting surface that matches the scan locus of the clock beam at the photodetector location. This type of curved photodetector structure can be achieved in a single continuous surface PIN photodiode or photomultiplier device; or by constructing a curved detector unit from individually angled photodetectors; or by placing a curved translucent scattering surface in front of either a single flat photodetector or several flat photodetectors. The wavelength blocking filter may also have a curved profile, when incorporated into a grating clock system used in an internal drum imaging application.

The recording scan angle for an internal drum system incorporating the grating clock system may be limited to less than 180 degrees in order for the clock beam to track every recording scan beam position. When the proposed grating clock configuration is used in an internal drum system, the $\lambda_2$ diode laser and its collimated/-focusing lens, the dichroic beam combiner 252, the spherical concave mirror 264 with attached clock grating 266, the wavelength blocking filter 262, and the photodetector element 260 are all attached to the slide assembly used to translate the DRUM deflector unit 250 and predeflector focusing lens (not shown) along the axis of the internal drum imaging surface. None of these deflector system elements need be translated when used in a flat-field imaging system.

From the foregoing description, it will be apparent that improved deflector and scanning elements and control systems have been described. Variations and modifications in the herein described systems and elements, within the scope of the invention, will undoubtedly suggest themselves to those skilled in the art. The foregoing description and drawings should therefore be taken as illustrative and not in a limiting sense.

I claim:

1. A scanner which scans a light beam which is incident thereon up to 360° about an axis of rotation across a flat field or a cylindrical imaging surface within which the scanner is disposed, said scanner comprising a body rotatable about said axis and having a partially reflecting surface on which said beam is incident and is split into dual beams reflected and transmitted in different directions, a first of which directions is toward said imaging surface and is also transverse to said axis and a second of which directions is away from said imaging surface, a mirror transverse to the path of one of said dual beams, said mirror retroreflects said one of said dual beams, and said retroreflected beam being incident on said partially reflecting surface and projecting therefrom in a direction transverse to said axis to provide an output scanning beam which scans said imaging surface.

2. The scanner according to claim 1 wherein said surface provides a non-polarizing beam splitter.

3. The scanner according to claim 1 further comprising means in the path of said incident beam and in said surface for providing a spatial beam splitter.

4. The scanner according to claim 3 wherein said spatial beam splitter providing means comprises a plate having said surface thereon and tilted with respect to said rotation axis, said surface being reflective and facing said mirror, said surface having a clear aperture therein along said axis, said scanner further comprises a lens focusing said incident beam in the vicinity of said aperture so that said beam diverges upon passing through said aperture and upon reflection from said mirror and is reflected by said reflective surface as said output beam.

5. The scanner according to claim 4 further comprising an enclosure having said plate therein, said lens having sufficient power to define a virtual image for said beam focused at a point outside said enclosure when projected from said reflective surface in a direction opposite to said output beam.

6. The scanner according to claim 3 wherein said spatial beam splitter providing means comprises a region in said surface intersected by said rotation axis which is reflective and reflects an incident beam toward said mirror, at least part of said surface around said region being optically transmissive, and a lens in the path of said incident beam having a focus in the vicinity of said region, said beam being reflected from said region to said mirror and retroreflected by said mirror through said transmissive part of said surface as said output beam.

7. The scanner according to claim 6 wherein said mirror is concave about an optical axis transversed to said rotation axis through said region and has power.

8. The scanner according to claim 7 wherein said concave mirror is a Mangin mirror.

9. The scanner according to claim 7 further comprising a focusing lens along said mirror optical axis through which said output beam passes.

10. The scanner according to claim 9 further comprising an enclosure for said body having windows therein opposite each other along said optical axis, one of said windows facing said region and containing said mirror and the other of said windows containing said focusing lens.

11. The scanner according to claim 1 wherein said dual beams are a first beam which is incident on said mirror and is retroreflected therefrom and a second beam which is not retroreflected therefrom and further comprising means for absorbing said second beam.

12. The scanner according to claim 11 wherein said second beam is the transmitted one of said dual beams and is absorbed by said absorbing means, and said second direction being the direction in which said second beam is transmitted, said second direction being generally along said axis.

13. The scanner according to claim 11 wherein said second beam is the reflected one of said dual beams and is absorbed by said absorbing means, and said second direction being transverse to said axis.

14. The scanner according to claim 1 wherein said retroreflected beam is further split into said output scanning beam and a third beam in the direction opposite to said incident beam, and said scanner further comprises means for tilting said third beam out of collinearity with said incident beam.

15. The scanner according to claim 14 wherein said tilting means comprises portions of said body on opposite sides of said surface being of different indices of refraction.

16. The scanner according to claim 15 wherein said first beam transmitted along said path generally along said axis and said second beam is reflected along said path transverse to said axis, said one of said first and second beams being said first beam.

17. The scanner according to claim 16 wherein an element of light absorbing material is disposed adjacent said body in the path of said second beam.

18. The scanner according to claim 14 wherein said tilting means comprises said body being identical right angled prisms having surfaces along the hypotenuses thereof which define said partially reflecting surface, different ones of said prisms having internal angles with the hypotenuse surfaces thereof which are less and greater than 45° respectively, said prisms being disposed such that the internal angle of one of said prisms which is less than 45° is adjacent the internal angle of the other of said prisms which is greater than 45°.

19. The scanner according to claim 14 wherein said tilting means comprises said mirror having its reflective surface in non-perpendicular relationship with said incident beam.

20. The scanner according to claim 19 wherein said mirror's surface is tilted at an acute angle with respect to a plane perpendicular to said rotation axis.

21. The scanner according to claim 20 wherein said body is a cube having opposite sides on one of which said incident beam is incident, said mirror being disposed adjacent to the other of said opposite sides, and a transparent wedge shape member between said other of said opposite sides and said mirror and having an internal angle equal to said acute angle, said wedge having a surface perpendicular to said rotation axis against which said other of said opposite sides is disposed.

22. The scanner according to claim 1 wherein said incident beam is collinear with said rotation axis, and said scanner further comprises a focusing lens in the path of said incident beam to said body to provide a postobjective type deflector system.

23. The scanner according to claim 1 wherein said incident beam is collinear with said rotation axis, and said scanner further comprises an F-theta scanning lens in the path of said output beam to provide a preobjective type deflector system.

24. The scanner according to claim 1 wherein said body comprises two identical right angle prisms having hypotenuse surfaces in contact to define a cube, said partially reflecting surface being at said hypotenuse surfaces.

25. The scanner according to claim 24 wherein said cube has first and second surfaces intersected by said rotation axis and opposite to said hypotenuse surfaces, and said cube has third and fourth surfaces generally parallel to said rotation axis, said incident beam being incident on said first surface and said output scanning beam intersecting said fourth surface, one of said second and third surfaces being reflective and the other absorptive of light.

26. The scanner according to claim 25 wherein said cube has flat sections at the corners thereof where the first, third and fourth and the second, third and fourth surfaces intersect.

27. The system according to claim 1 further comprising a housing rotatable about said rotation axis and having an input side through which said incident beam enters, said body being a plate having said partially reflective surface thereon, said plate being disposed in said housing with said surface at an angle of about 45° to said rotation axis, an output window in said housing facing said surface and through which said output scanning beam passes, a mirror, a light absorbing member, one of said mirror and light absorbing member being disposed in said housing and on the opposite side of said plate from said input side, and the other of said mirror and light absorbing member being disposed in said housing and on the opposite side of said plate from said window.

28. The scanner according to claim 1 further comprises a hub on which said body is disposed, a cylindrical wall on said hub around said body, said wall having an opening for said output beam, and an output window on said wall over said opening.

29. The scanner according to claim 28 wherein said window is a transparent plastic sheet conforming to said window.

30. The scanner according to claim 29 wherein said plastic sheet is heat shrinked to the wall around said window.

31. The scanner according to claim 28 wherein said body is a cube transverse to said axis of rotation on first and second opposite sides thereof, said incident beam being incident on said first of said opposite sides and said mirror being disposed on the other of said opposite sides and against said hub, a cylindrical wall on said hub around said cube, said cube having corners generally parallel to said rotation axis and connected to said wall on the inside thereof.

32. The scanner according to claim 28 wherein said body is a cube, and said scanner further comprises a mounting plate to which said cube is attached on a side thereof opposite to the side upon which said incident beam is incident, and means for adjustably attaching said mounting plate to said hub.

33. The scanner according to claim 1 further comprising a hub on which said body is mounted, a generally cylindrical cup shaped transparent shell connected to said hub and encompassing said body, said shell defining a lens for compensating for statically and dynamically induced imaging power in said scanner.

34. The scanner according to claim 1 wherein said body is a cylinder collinear with said rotation axis, said cylinder being defined by a pair of prisms having hypotenuse surfaces facing each other at least one of which provides said partially reflecting surface, said incident beam being incident on one end of said cylinder, light absorbing material being disposed in proximity to an end of said cylinder opposite to said one end, said mirror being provided on a first wall region of said cylinder facing said surface on one side thereof to retroreflect said beam through surface to a second wall region opposite to said first wall region, and a cylindrical lens having power in a direction generally perpendicular to said output beam and disposed in the path of said incident beam, said cylindrical lens laving a focus within said cylinder near said first wall region.

35. The scanner according to claim 1 wherein said body is a cylinder having its axis collinear with said rotation axis, said cylinder body having opposite ends on one of which said incident beam is incident and in the proximity of the other of which said mirror is disposed, said cylinder having opposite wall regions from one of which said output beam projects and the other of which has light absorbing material thereon, said one wall region being flat in a plane parallel to the axis of said cylinder.

36. A scanner system for providing a first scanning beam of a first wavelength and a second beam of a second wavelength different from said first wavelength which tracks said scanning beam as it scans an image surface to provide a signal indicative of the in-scan tracking error of said system, said system comprising a deflector rotatable about an axis and having a dichroic beam splitter which provides a transmitted beam of said first wavelength, a mirror in the path of said transmitted beam which retroreflects the transmitted beam to said beam splitter where said transmitted beam is reflected transverse to said rotational axis as said first scanning beam, a dichroic beam combiner in the path of light of said first and second wavelengths which directs combined light of said first and second wavelengths to said beam splitter where the light of said second wavelength is reflected as said second beam in a direction opposite to said scanning beam, and means responsive to light of said second wavelength from said second beam for providing said signal.

37. The scanning system according to claim 36 further comprising the scanner according to claim 1 which provides said dichroic beam splitter at said partially reflecting surface thereof and said mirror as said mirror in the path of said one of said dual beams thereof.

38. The scanner system according to claim 36 wherein said signal providing means comprises a second mirror having a curved surface centered at said rotational axis, a clock track on said curve surface, said second mirror and a photo detector being disposed successively in the path of said tracking beam.

39. The system according to claim 38 further comprising means for blocking light of said first wavelength which is incident on said photo detector.

40. A scanner which scans a light beam which is incident thereon about an axis of rotation across a flat field or a cylindrical imaging surface within which the scanner is disposed, said scanner comprising a body rotatable about said axis and having a partially reflecting surface on which said beam is incident and is split into dual beams a first of which is reflected and a second of which is transmitted therethrough, said beams extending in differently directed paths one of said paths being generally along said axis and the other of said paths being transverse to said axis, a mirror transverse the path of one of said dual beams, said mirror retroreflects said one of said dual beams towards said partially reflecting surface, said retroreflected beam being incident on said partially reflecting surface and projecting therefrom in a direction transverse to said axis to provide an output scanning beam which scans said imaging surface.

41. The scanner according to claim 40 wherein said first beam is reflected along said path transverse to said axis and said second beam is transmitted along said path generally along said axis, said one of said first and second beams being said first beam.

42. The scanner according to claim 41 wherein an element of light absorbing material is disposed adjacent said body in the path of said second beam.

43. A scanner which scans a light beam which is incident thereon up to 360° about an axis of rotation across a flat field or a cylindrical imaging surface, said scanner comprising a body rotatable about said axis and having a partially reflective surface defining a spatial beam splitter, said beam splitter reflects said incident beam along the path transverse to said axis, or said beam splitter transmits said incident beam along a path generally along said axis, a mirror transverse to the path of said beam which retroreflects said beam in a direction towards said partially reflective surface where said retroreflected beam is transmitted or reflected in a direction towards said imaging surface in a direction transverse to said axis to provide an output scanning beam which scans said imaging surface.

44. The scanner according to claim 43 wherein said surface has first and second portions which are respectively reflective and transmissive, said first portion surrounding said second portion and said incident beam being incident on said second portion, and said path of said beam being generally along said axis, and the majority of said retroreflected beam being incident on said first portion and reflected toward said imaging surface.

45. The scanner according to claim 43 wherein said surface has first and second portions which are respectively transmissive and reflective, said first portion surrounding said second portion, and said incident beam being incident on said second portion and said path of said beam being transverse to said axis, and the majority of said retroreflected beam being incident on said first portion and transmitted therethrough toward said imaging surface.

* * * * *